Feb. 22, 1938. M. RICHTER ET AL 2,109,140
AUTOMATIC SPINDLE RESETTING MECHANISM
Filed May 28, 1935 14 Sheets—Sheet 9
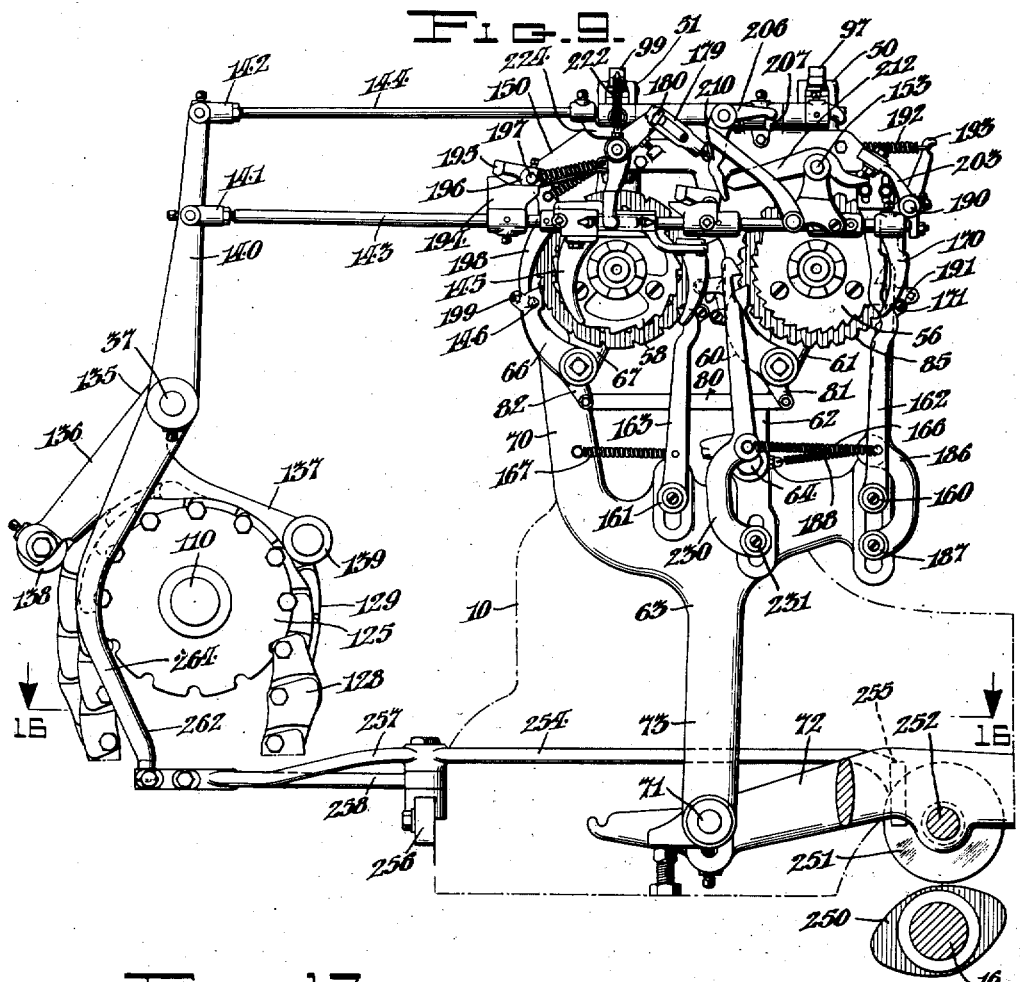
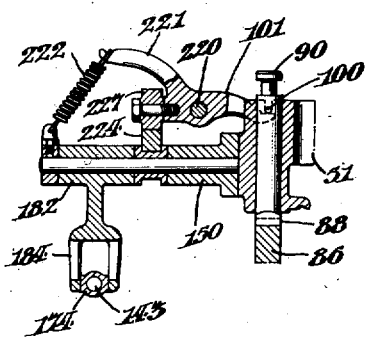
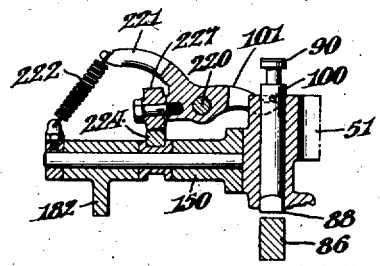
INVENTORS:
Max Richter &
Julius Bareiss,
BY
ATTORNEY.

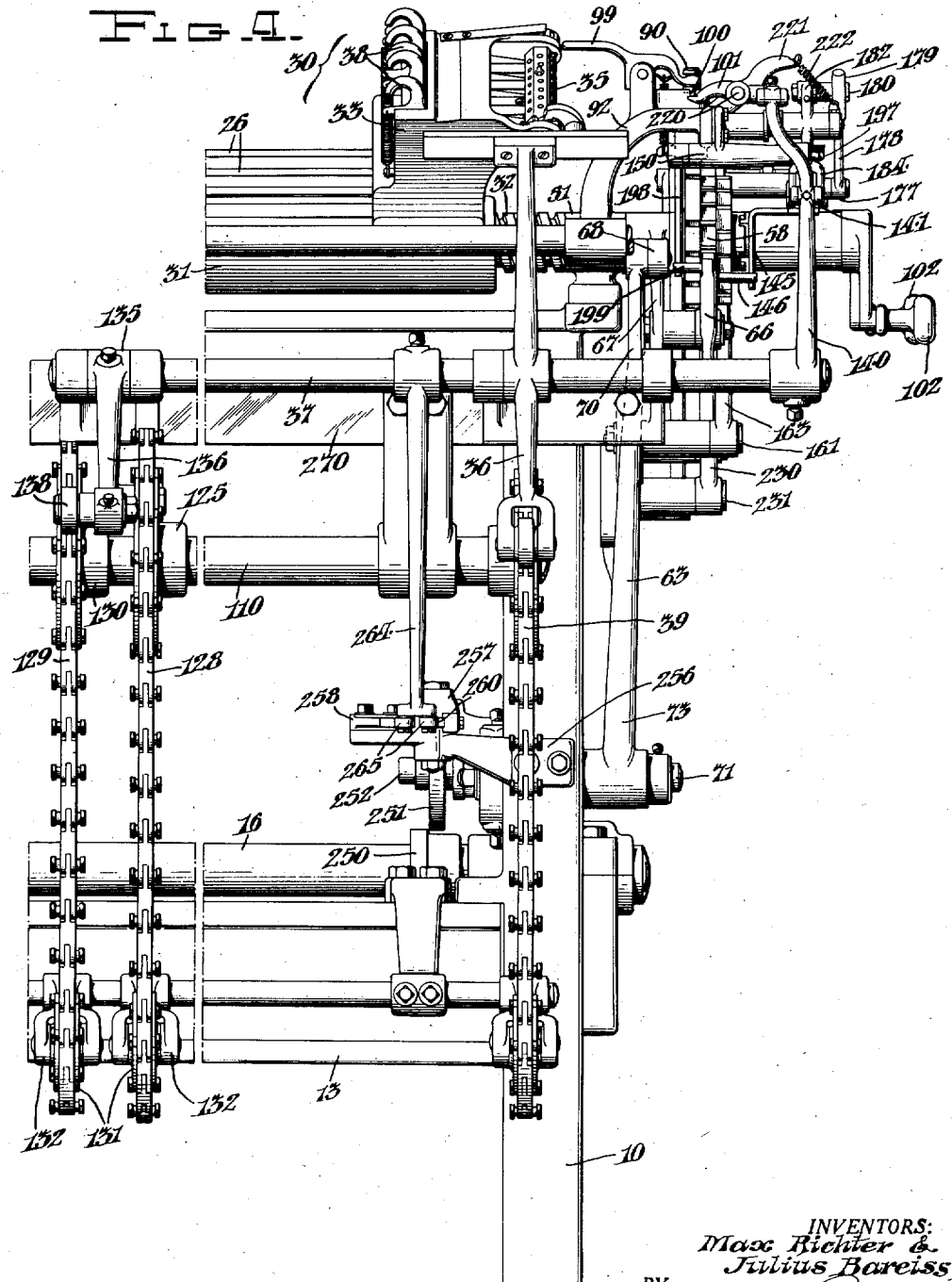

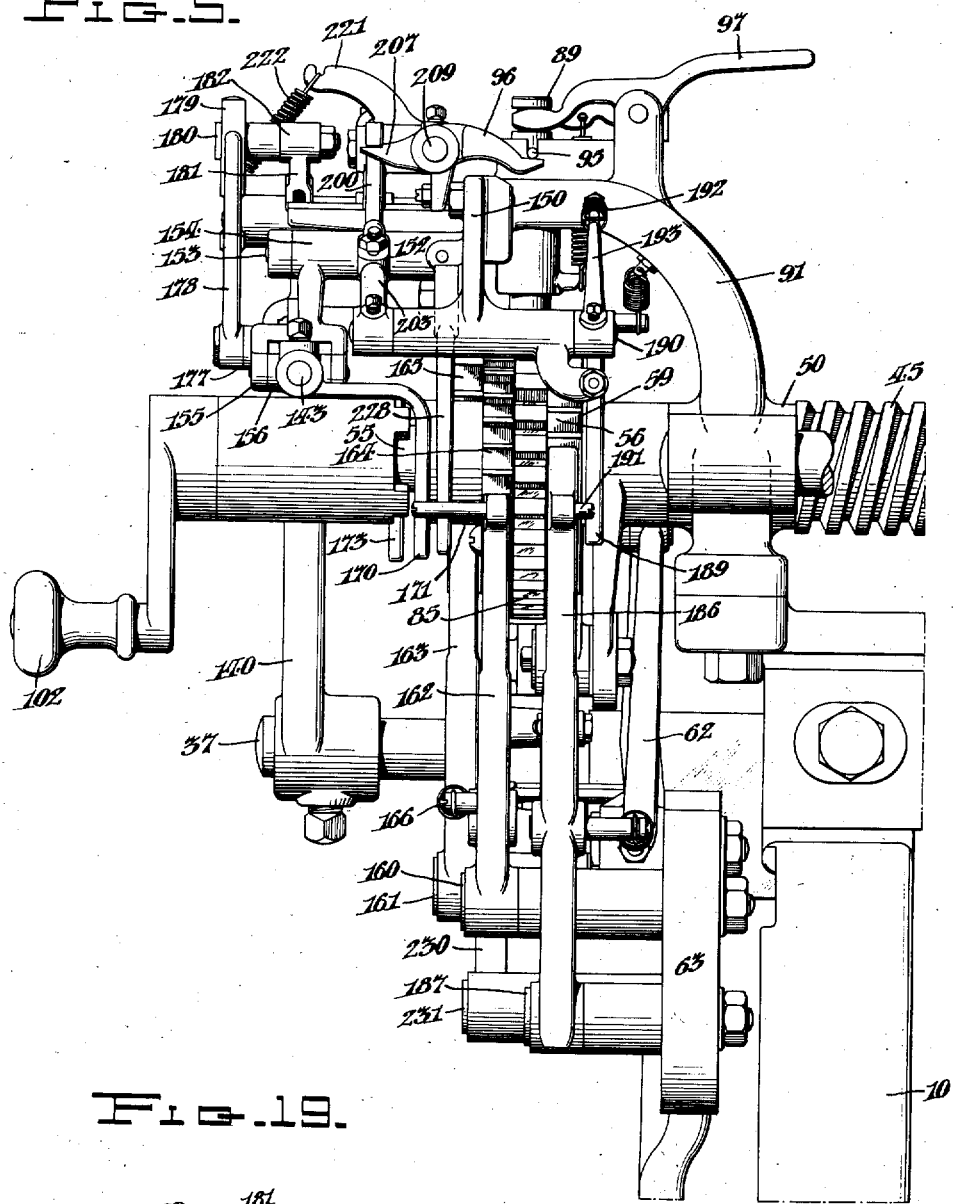

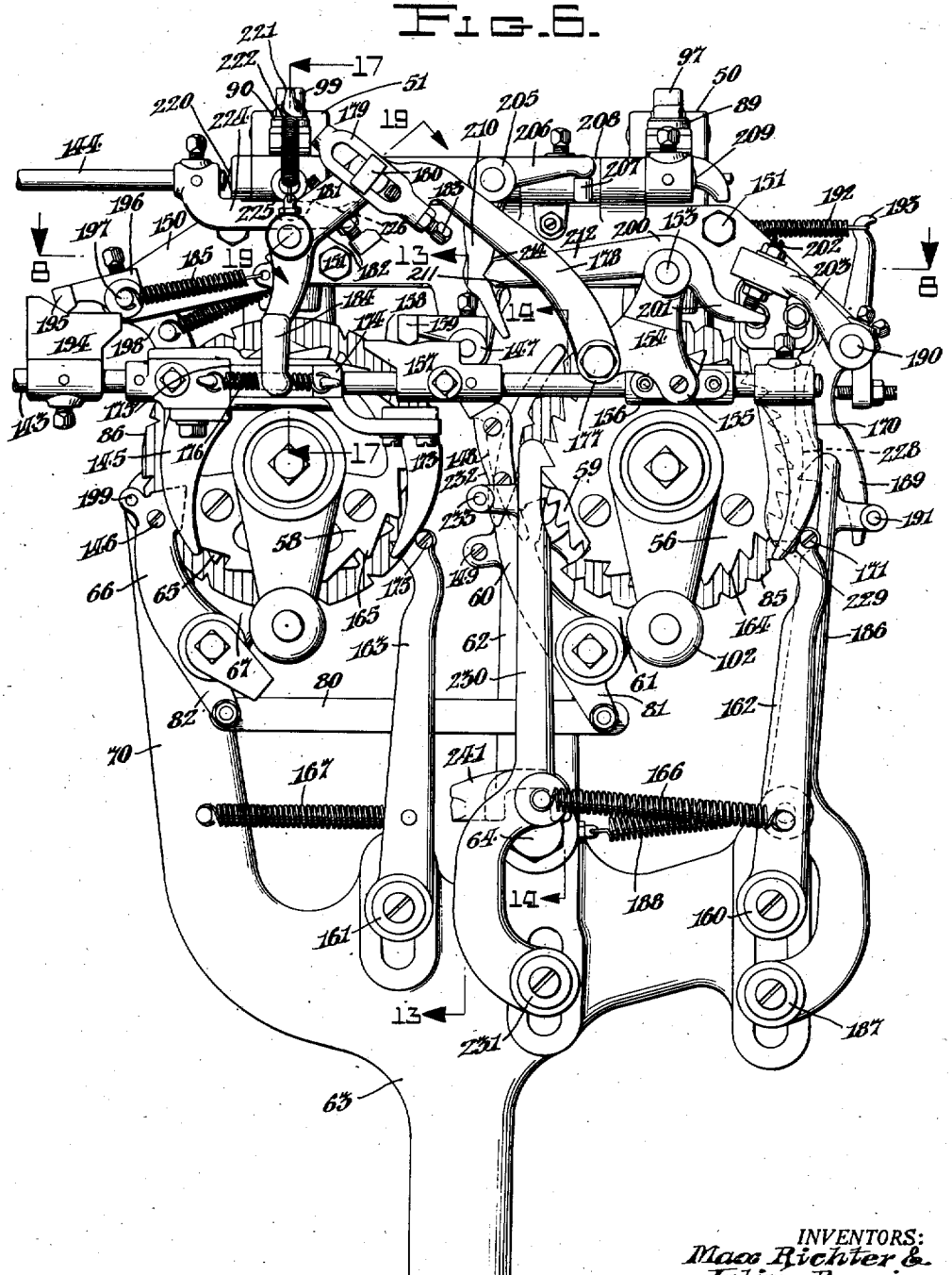

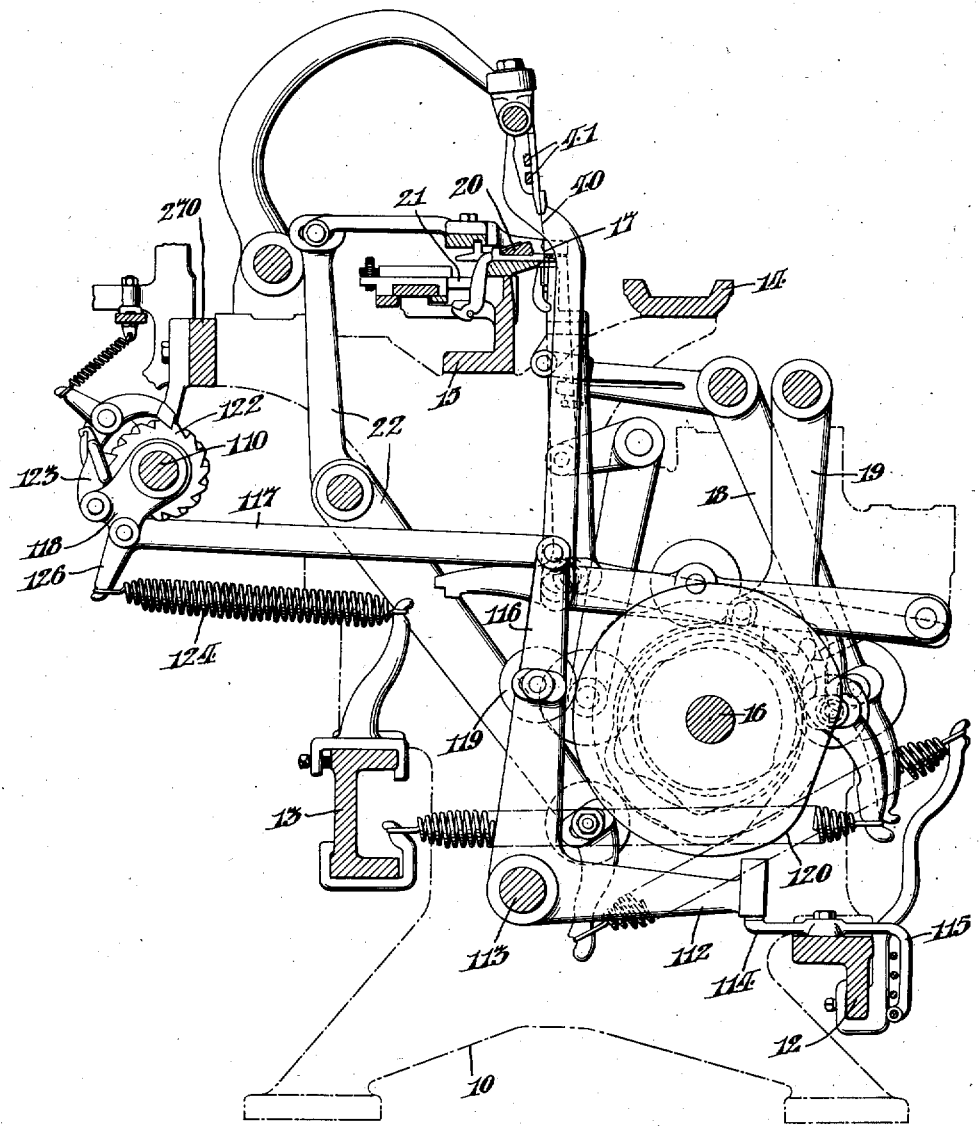

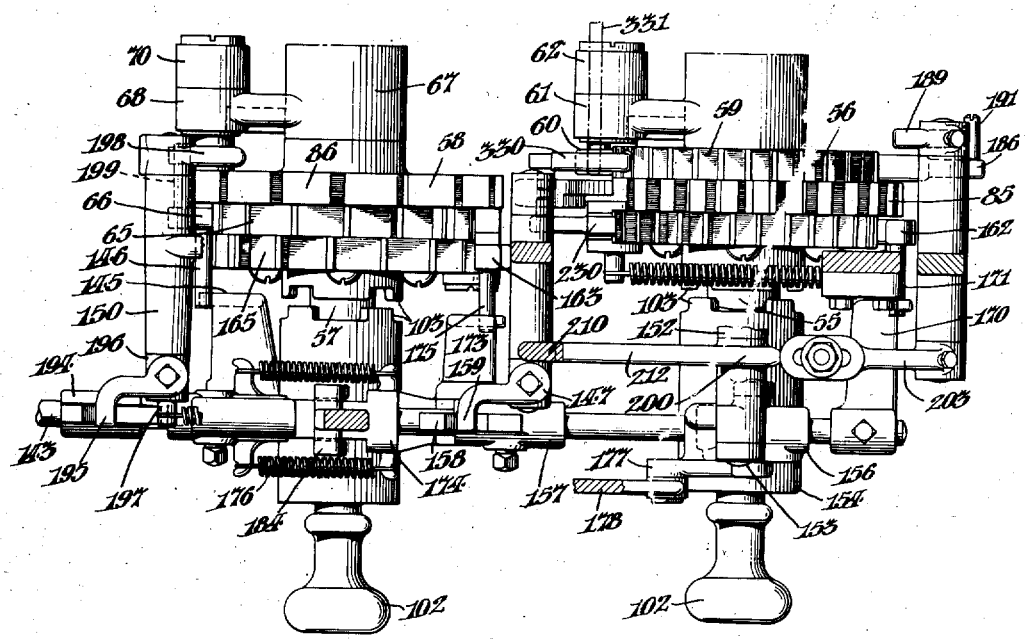
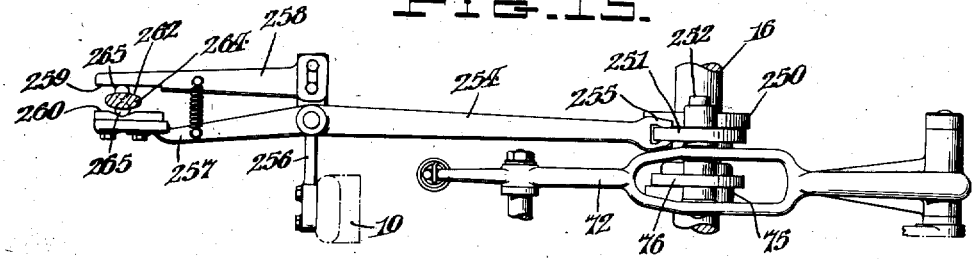
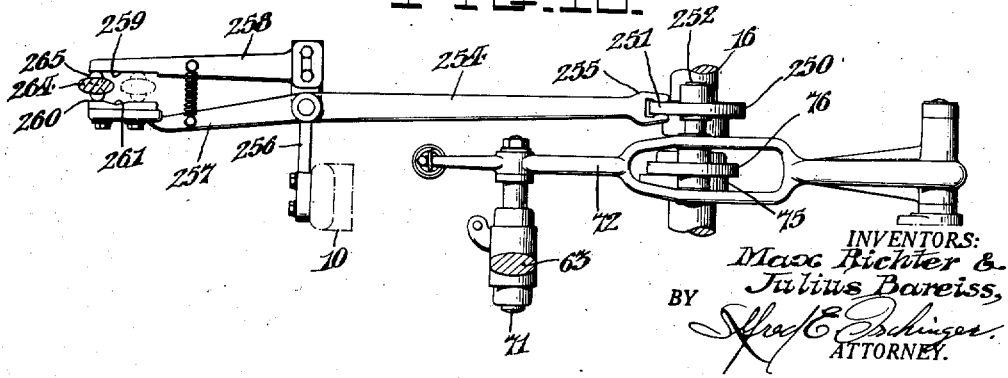

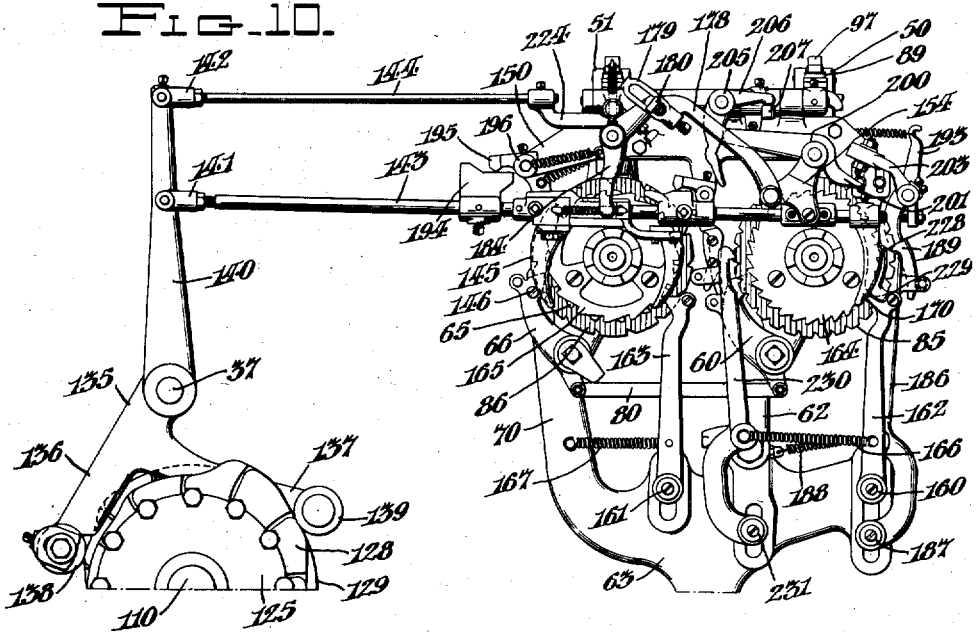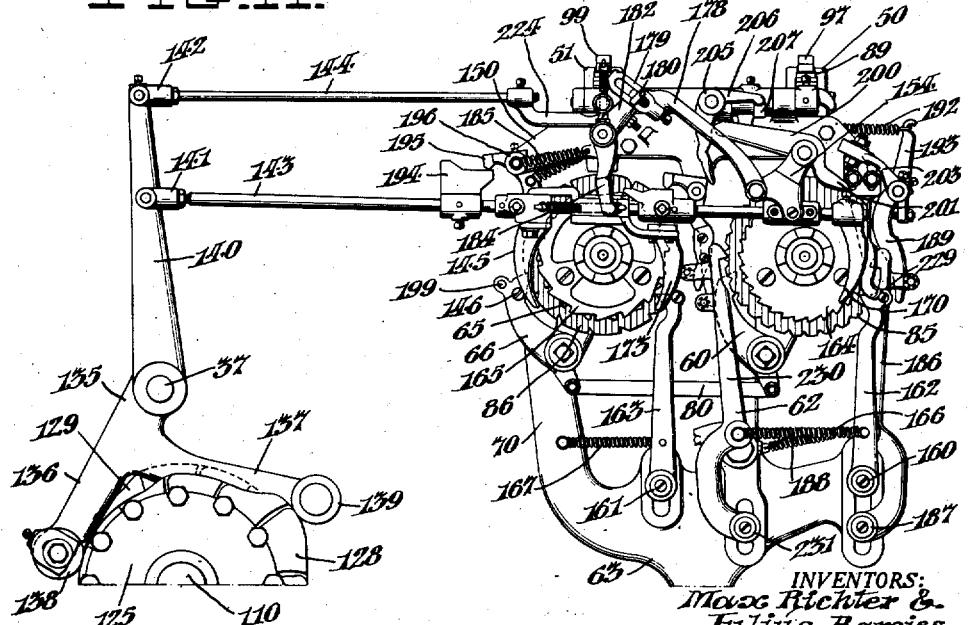

Feb. 22, 1938.　　　M. RICHTER ET AL　　　2,109,140
AUTOMATIC SPINDLE RESETTING MECHANISM
Filed May 28, 1935　　　14 Sheets-Sheet 11
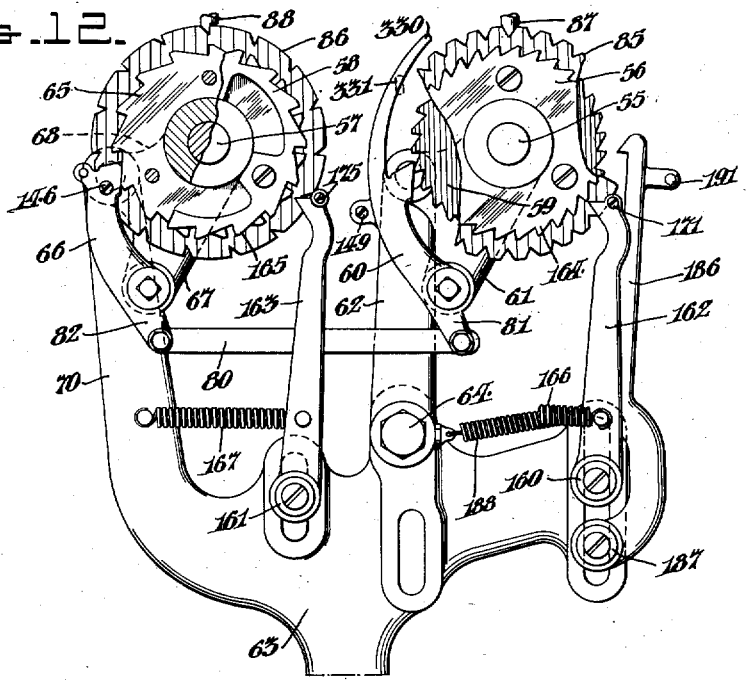
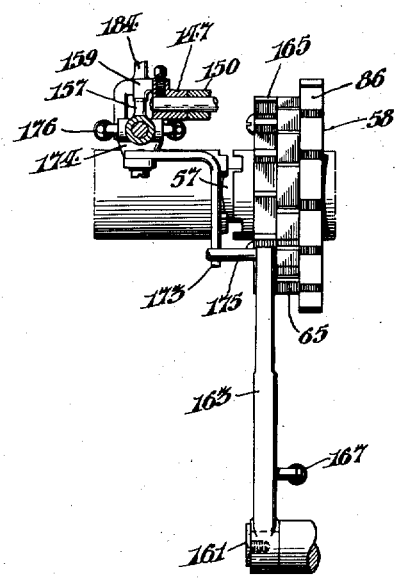
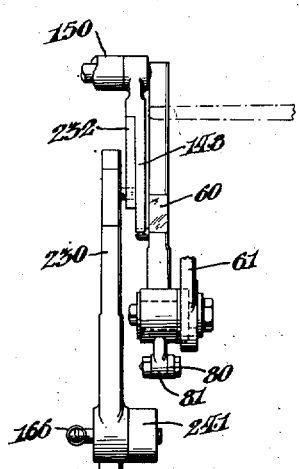
INVENTORS:
Max Richter &
Julius Bareiss,
BY
Fred E. Oehinger
ATTORNEY.

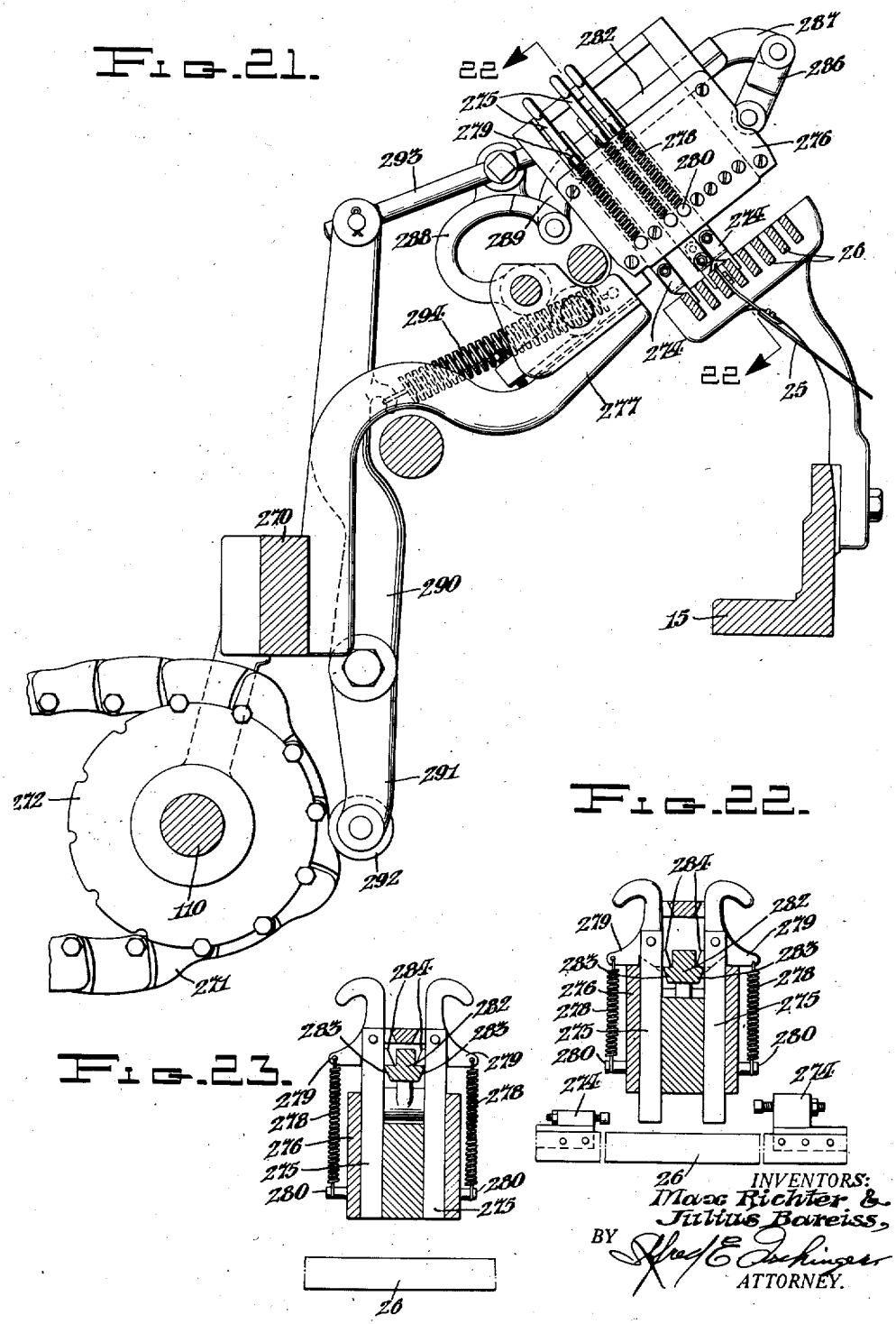

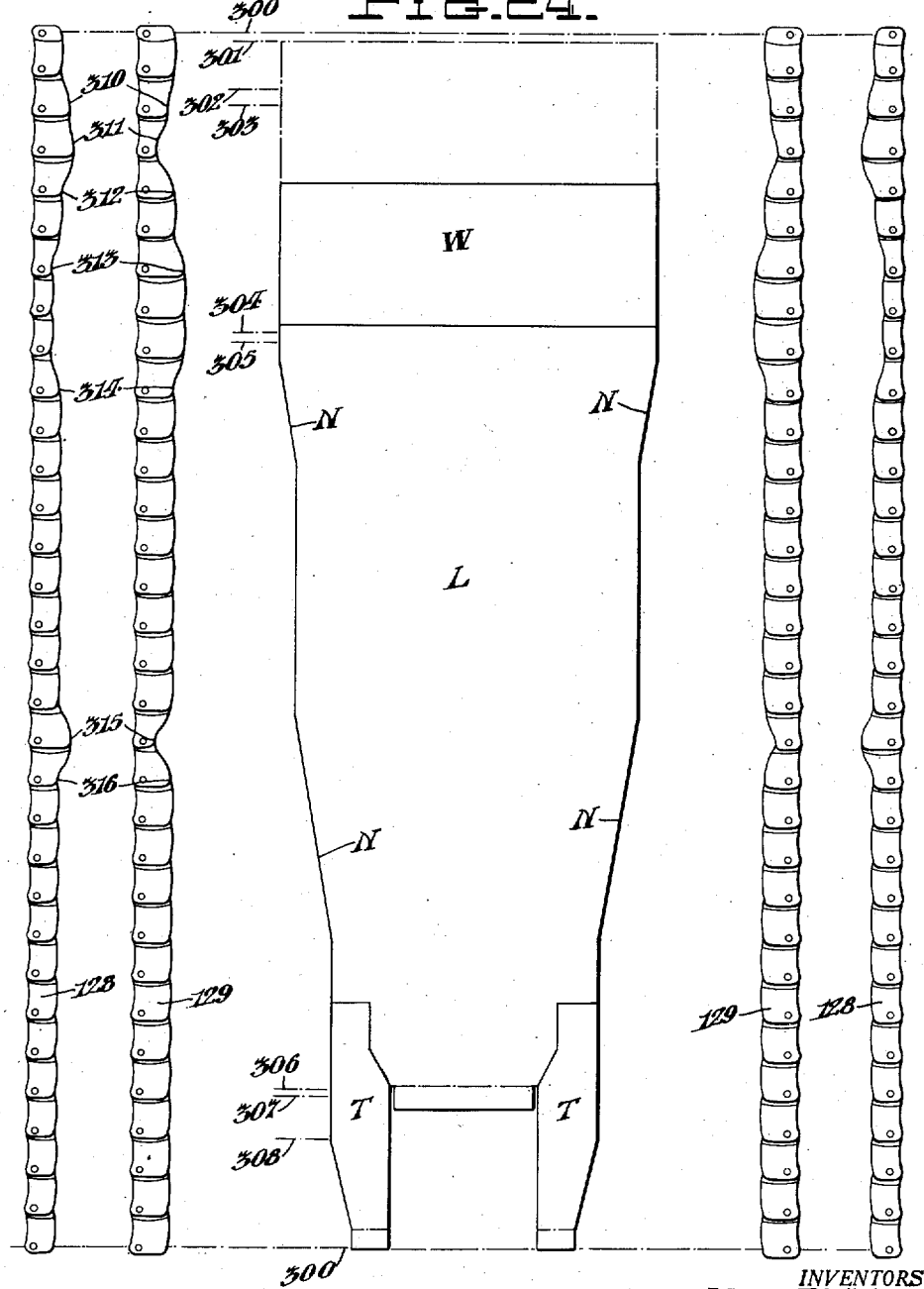

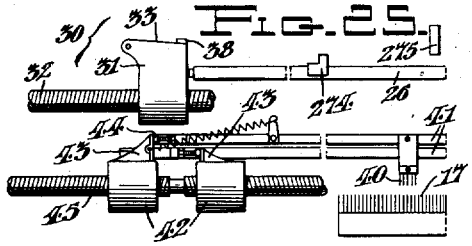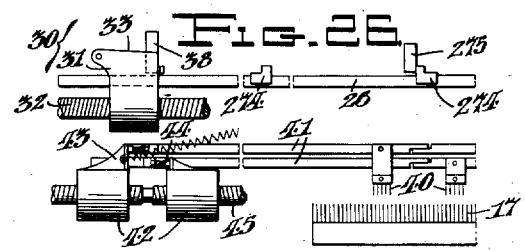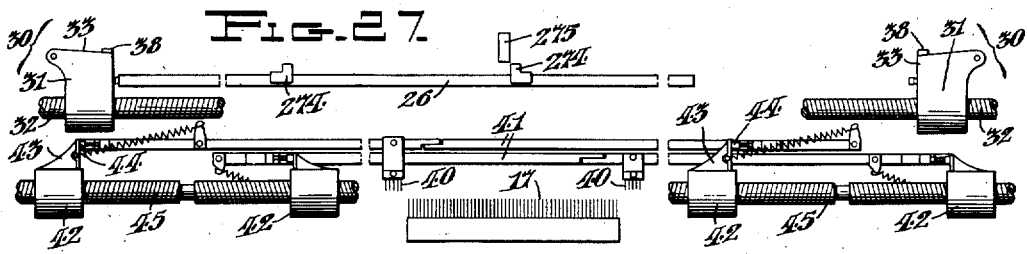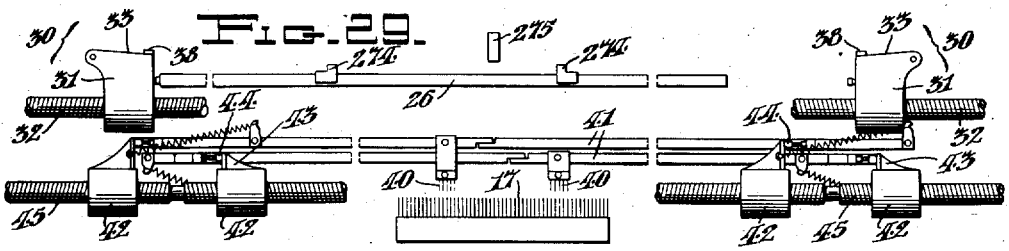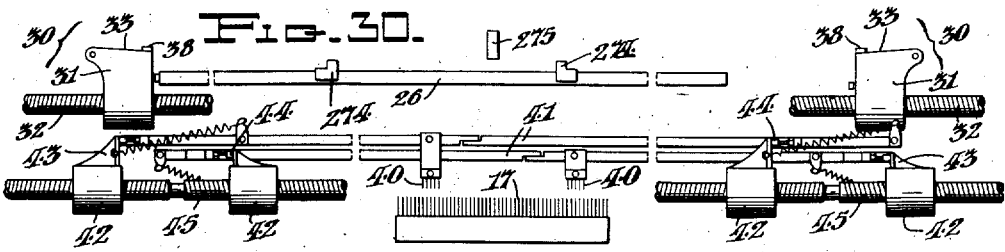

Patented Feb. 22, 1938

2,109,140

UNITED STATES PATENT OFFICE 2,109,140

AUTOMATIC SPINDLE RESETTING MECHANISM

Max Richter, West Reading, and Julius Bareiss, Wyomissing, Pa., assignors to Textile Machine Works, Wyomissing, Pa., a corporation of Pennsylvania Application May 28, 1935, Serial No. 23,834

29 Claims. (Cl. 66—89)

This invention, relating to improvements in full fashioned knitting machines, is more particularly directed to a new and improved automatically operated means for resetting the yarn carrier and narrowing mechanisms of such machines.

In a straight knitting machine of the type for producing full-fashioned stockings, the knitting needles are supplied with yarn by one or more reciprocating yarn carriers, the traversing movement of which is gradually decreased in accordance with the given pattern of the article being knit and in conjunction with the operation of the narrowing point control devices, as to effect a narrowing or fashioning of the fabric. This narrowing of stocking blanks is common in the instant art, and heretofore the devices for effecting the same have been mechanically operated through connections to the actuating mechanism of the knitting machine, that is, the narrowing mechanism has been controlled substantially automatically during the knitting. It has, however, in these known prior machines been required to manually reset certain of the actuating elements of the narrowing mechanism to original or starting position at the completion of each stocking blank, and during the time needed for this readjustment or resetting the machine must be held inoperative.

It is an object of this invention to provide novel means in a full-fashioned knitting machine which permits the operation of the machine to continue with the knitting of the welt portion of a stocking blank immediately upon the completion of the previously knit blank.

Another object of the invention is to provide means for automatically operating the narrowing mechanism of a full-fashioned knitting machine to reset the same to its starting position during such time as the knitting mechanism of the machine is functioning.

A further object of the invention is to provide a new and improved mechanism adapted to automatically and simultaneously reset all of the composite elements of the narrowing mechanism, e. g. the yarn-carrier end stops and the narrowing point rods.

The present invention also contemplates the provision in a straight knitting machine of a novel auxiliary stop device, whereby the yarn carriers may be operated independently of the regular end stop devices, the same being particularly efficacious in association with means for mechanically resetting the narrowing mechanism.

Several useful and novel time-saving attachments are provided by this invention to operate in conjunction with the mechanism for resetting the narrowing devices. These resetting mechanism adjuncts are: connections between the main cam shaft and the resetting device providing a variable in the operating speed of the latter; an auxiliary control shaft and pattern chain control elements carried thereby, which are operated by but independently of the main cam shaft; and the construction and arrangement of the moving elements of the resetting mechanism and control devices therefor in such manner as to have practically no strain or wear in use.

With these and other objects in view, which will become apparent from the following detailed description of the illustrative embodiments of the invention shown in the accompanying drawings, our invention resides in the novel elements of construction, devices and combination of parts in cooperative relationship, as hereinafter more particularly set forth in the claims.

In the drawings:

Fig. 4 is a view on an enlarged scale of the rear part of the mechanism shown at the left of Fig. 1;

Fig. 5 is a front elevational view on a still larger scale of the embodiment of the invention in its attachment to the end of a full-fashioned knitting machine;

Fig. 6 is an end elevation looking from the left in Fig. 5;

Fig. 7 is a cross-sectional view of the machine taken approximately on the line 7—7 of Fig. 1;

Fig. 8 is a view taken on line 8—8 of Fig. 6 showing in elevation the ratchet and pawl elements of this invention;

Fig. 9 is a detail view similar to Fig. 2, on a larger scale, showing the improved mechanism in one particular phase of its cycle of operation;

Figs. 10 and 11 are views similar to Fig. 9 showing such mechanism in other phases in its cycle of operation;

Fig. 12 is a fragmentary view in elevation of the pawl and ratchet elements;

Fig. 13 is a view taken on line 13—13 in Fig. 6 looking in the direction of the arrows;

Fig. 14 is a section taken on line 14—14 of Fig. 6;

Fig. 15 is a detail sectional view taken on line 15—15 of Fig. 2;

Fig. 16 is a similar view taken on line 16—16 of Fig. 9;

Fig. 17 is a detail sectional view taken on line 17—17 of Fig. 6;

Fig. 18 is a view similar to Fig. 17 showing the elements in the operating position thereof corresponding to the showing in Fig. 10;

Fig. 19 is a sectional view taken on line 19—19 of Fig. 6;

Fig. 21 is a detail cross-sectional view taken on line 21—21 of Fig. 1, to illustrate the auxiliary stop mechanism;

Fig. 22 is a detail sectional view taken on line 22—22 of Fig. 21;

Fig. 23 is a similar view showing the elements in a different position;

Figure 1:
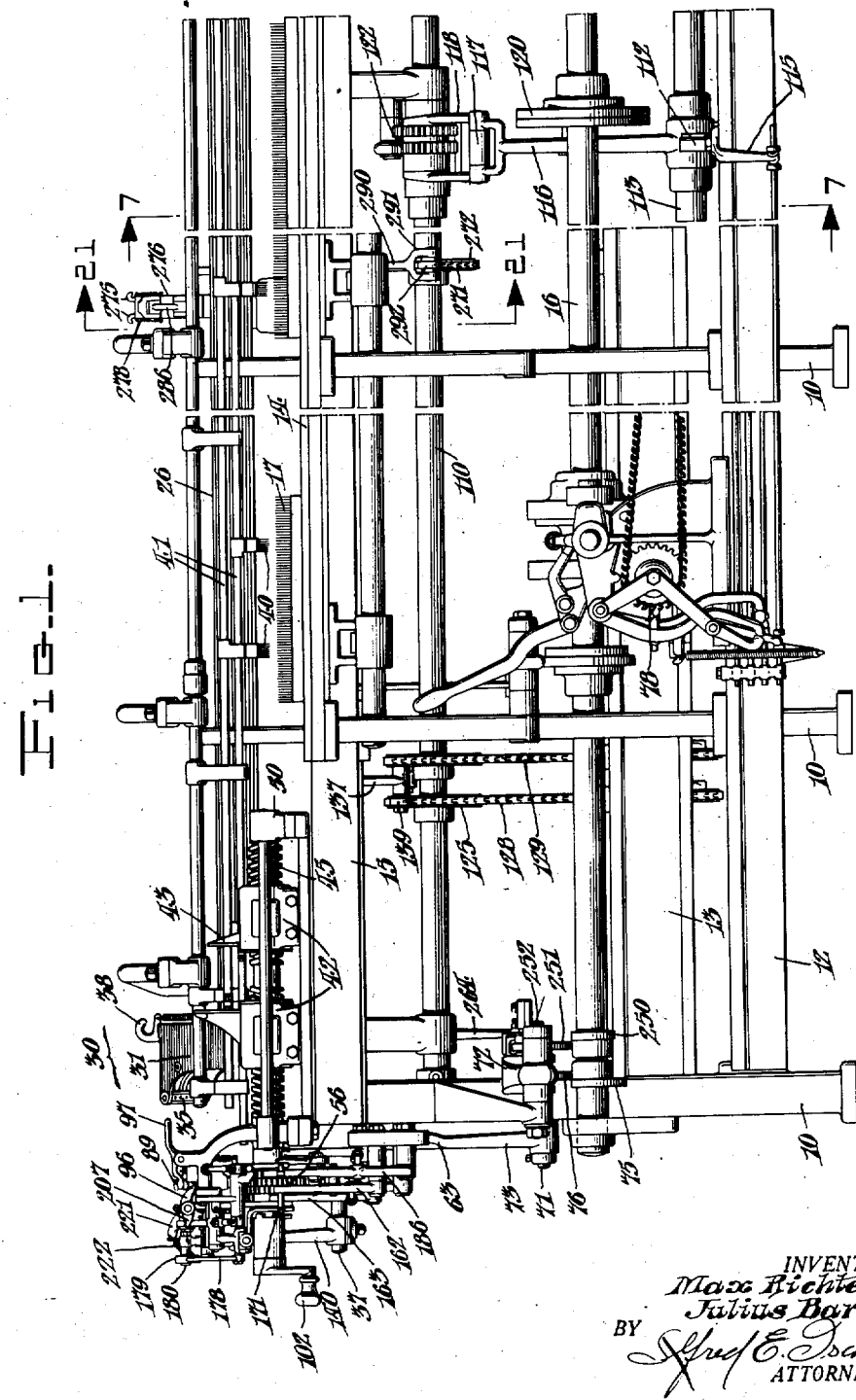
Figure 1 is a front elevational view of a full-fashioned knitting machine, this view showing only the left side portion of such type machine and having operatively associated therewith the novel mechanism of this invention.

Fig. 24 is a diagram of the leg blank of a full-fashioned stocking together with pairs of pattern chains as developed or opened out along straight lines in side elevation from their normal loop shape, indicating the portions along the blank to which the automatic resetting devices are operated and the corresponding links of the chains by which such operations are effected; and Figs. 25 to 30, inclusive, are diagrammatic views of the relationship between certain of the elements of a straight knitting machine during a complete cycle in the operation of the machine, such views corresponding to the positions indicated along the blank of Fig. 21.

In order to facilitate a complete understanding of the present invention, we shall first briefly describe a full-fashioned stocking blank along with certain straight knitting machine elements and their function at various formative stages of the blank. As is well known, a full-fashioned stocking blank is produced by the successive operation of the needle and loop forming mechanism of the machine and such devices operate to provide continuous courses from the welt or starting point of the blank to the heel or toe portion thereof. At certain portions in the length of a blank the width of the courses is automatically decreased to provide the certain well known full-fashioned construction. It will be apparent from an understanding of the machines of this type that the narrowing mechanisms, including the loop transfer points and the various thread or yarn carrying mechanisms, are moved relatively closer one to the other at the finish of a stocking blank than they were at the start. Accordingly, it is necessary to reset or reposition such narrowing and yarn carrier devices to their original position before starting the next successive blank. In all machines prior to this invention, so far as we are aware, this operation has been carried on by the manual manipulation of the resetting devices, a machine being inoperative at such time or in certain of the semi-automatic machines of a lesser known type while the resetting device may be somehow reset mechanically, the machine also being incapable of performing any knitting function until the aforesaid thread carrier and narrowing mechanisms are at their starting positions.

As hereinbefore stated, it is a primary object of this invention to provide a new and improved method and apparatus adaptable for a straight full-fashioned knitting machine whereby the same may be mechanically operated in a more efficient manner than possible heretofore. With the improved machine which is to be disclosed in detail in the following description, the several instrumentalities and mechanisms necessary for the formation of a full-fashioned stocking blank are individually and collectively automatically operated, and all of such operations are performed within the time required to complete the knitting of the courses in the full-fashioned stocking blank.

In the operation of a full-fashioned knitting machine, the start of the knitting constitutes the welt portion of the stocking, this welt being the widest part of the stocking blank. To the lower edge of the welt is knit the leg portion of the stocking and throughout the latter at various points the courses are decreased in width; as for example at the knee section, loop transfer points engage several of the outermost loops in a course and move the same inwardly two needles on each side. Thus, when the blank reaches the heel portion it is considerably narrower than when started, and at this latter position the narrowing is continued to reduce the width of the heel tabs.

The full cycle in the knitting of a full-fashioned leg blank is shown in several of its various phases in the Figs. 25 to 30, inclusive, wherein are illustrated certain conventional elements of a straight knitting machine including a needle bank, yarn carrying mechanism and means for regulating the extent of travel thereof relative to the needles, the narrowing device and the means for simultaneously actuating the transfer points at both ends of each bank of needles. These diagrammatic views are arranged to sequentially illustrate the several essential positions of the knitting elements throughout their complete cycle of movement, which several positions of the knitting elements, as will appear more in detail in the following description, are brought about entirely through the automatic operation of the novel mechanisms and devices of this invention.

One embodiment of the invention, as illustrated, and the herein detailed description, are directed particularly to a full-fashioned knitting machine of the "Reading" type. The drawings illustrate various parts of a "Reading" full-fashioned stocking knitting machine embodying the new and improved mechanisms of this invention, in which for clearness only those parts of the various mechanisms necessary for an understanding of the invention are shown; the other parts and mechanisms and the operation thereof being well known in the art, as shown and described in the "Reading" Full-Fashioned Knitting Machine Catalogue, copyright 1929, published by the Textile Machine Works, Reading, Pennsylvania.

It is, however, intended that the present novel automatically controlled device may be adapted to so called "footers", or other types of straight knitting machines, including narrowing mechanisms and movable end stop devices for the yarn carriers, which require the operating elements of the narrowing mechanisms to be reset at the completion of the knitting so as to be in position for the start of the next article.

As has been stated in the foregoing, it is customary in straight knitting machines of the full-fashioned type to employ narrowing devices and actuating mechanisms therefor, which function together with the knitting elements to effect a decrease in the width of a blank; the same being ordinarily constituted in the arrangement of a series of narrowing or transfer points at the selvedge edges of the blank, which points are actuated to engage a plurality of the outermost loops in a course, to pick up such loops from the knitting needles and to then transfer the same inwardly of the blank to different needles in the same course. Usually the decrease in the width of the blank is at the rate of four loops (two at each side of the stocking) at every operation of the narrowing mechanism. Accordingly, it will be apparent from an understanding of such well known narrowing mechanisms, that at the completion of each blank the yarn carriers and the transfer points will be relatively close together, and the same must therefore be reset to initial positions preparatory to starting another blank. This has been done in the past by manually manipulating the appropriate resetting devices for both the narrowing and yarn carrier devices.

This invention provides a new and improved mechanism which is automatically operated by certain of the movable parts of a knitting machine to bring about an automatic resetting of the narrowing and carrier control elements, and one form thereof, illustrated in the accompanying drawings, is applied to a "Reading" full-fashioned stocking knitting machine in such manner as to require little or no change in the regular organization of the machine parts.

Referring now, to the specific showing in said drawings, the full-fashioned knitting machine for which the invention is adapted, includes the usual center and end frames 10, a front rail 12, a back rail 13, a front bed 14, and a center bed 15 in the usual assembly and upon which the operating parts of the machine are positioned. A series of journal members are fixed to the frames 10 for supporting the various shafts and like elements which are operated by cam discs carried by a main cam shaft 16, the latter being rotatably and axially shiftably supported by the machine frames.

As is usual in a machine of this type, there are provided knitting needle sections 17 fixedly carried at the upper end of needle bars to which are imparted the required vertical and horizontal movements by means of rocker arms 18 and 19 which are periodically operated by suitable cams on the main shaft 16. Operatively associated with the knitting needle sections are sinker-head assemblies 20, including the usual sinkers, dividers, jacks, catch bar, the slurring cam 21 and the catch bar lever 22, all of which are operated at the proper time by connections to the shaft 16 (some of these detail construction parts being shown in Figs. 1 and 7 and others not being shown).

Cooperating with the needle and loop forming elements are yarn guide devices 25 (only one of which is shown in the drawings) fixed to one or more carrier bars 26 which are intermittently reciprocated longitudinally of the machine by the well known couliering motion device. The extent of the travel of such carriers limits the widthwise dimension of the article being knit, which together with the loop transfer points of the narrowing mechanism permits the production of a full-fashioned stocking blank.

Figure 3:
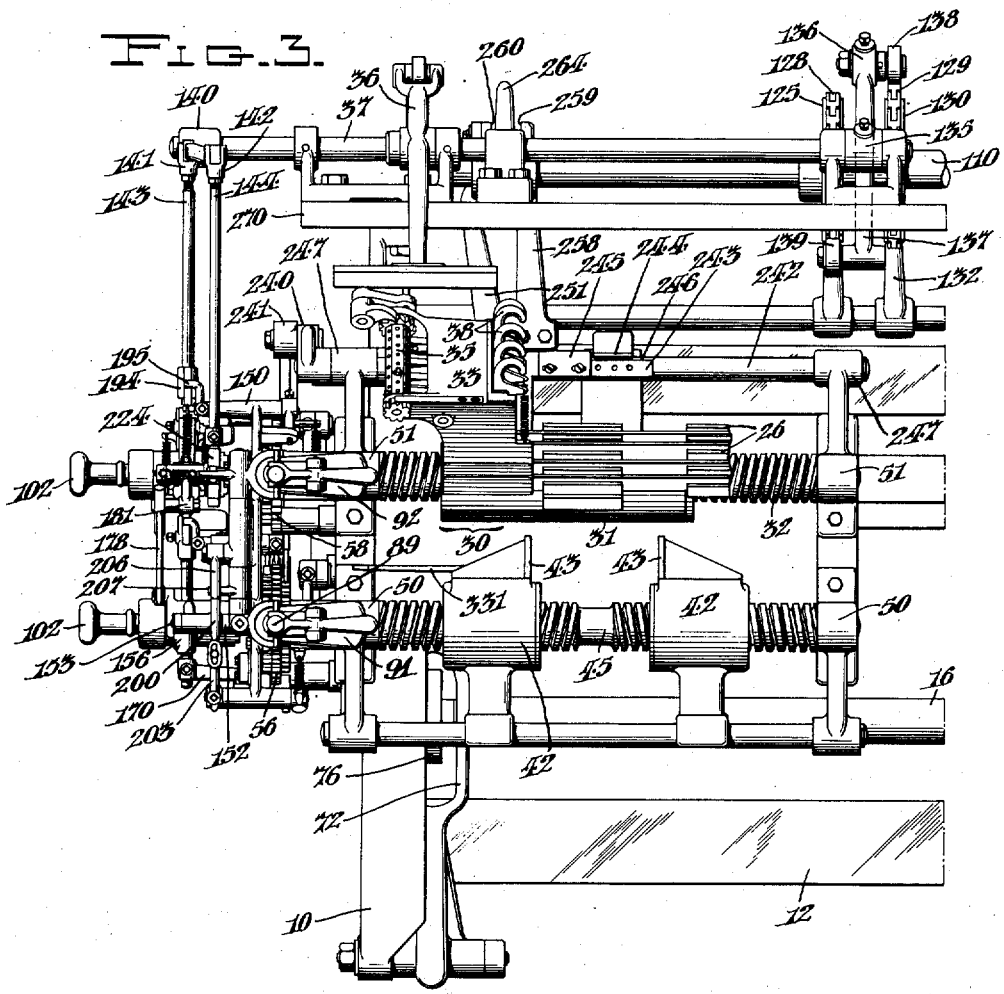
Fig. 3 is a top plan view of the portion of the machine shown in Fig. 1.

The yarn carrier bars 26 extend lengthwise of the machine and are adapted for actuation by friction boxes (not shown). At each end of the machine, on the center bed, is mounted an end-stop device 30, comprising a longitudinally movable threaded block or nut 31, which is supported upon an end-stop spindle or threaded screw 32, the spindles 32 at each end of the machine being reversely threaded to provide for the simultaneous approach and retraction of the respective end-stop nuts. The two screws or spindles 32 are actuated by devices, to be presently described, to move in unison. Suitable individual end stops for the several carrier bars are provided in an extension 33 on the nut 31, and these together with other mechanisms 35 and 36, shown denoted at 35 and 36 in Fig. 3, constitute means for selectively limiting the longitudinal movement of one or any combination of such carriers. The aforesaid control mechanisms 35 and 36 are described in detail in Patent No. 2,090,599, issued to Max Richter on August 17, 1938. So much of said Richter patent as is briefly shown herein, comprises automatically operated means for selecting and operating the movements of the yarn carrier bar individual stop devices. Insofar as the present invention may be concerned, it is necessary only that the well known yarn carrier and stop mechanism be advanced automatically so as to shorten the travel of the yarn guide whenever the width of the stocking blank is to be decreased. The carrier bars 26 are shown in the drawings as being selectively engaged by end stops 38 which are moved longitudinally of the machine by means of the threaded spindles 32, and which are moved in and out of operative position through the manipulation of the mechanisms 35 and 36. As seen in Figs. 3 and 4, the arm 36 is carried by a rock shaft 37 at the rear of the machine and is actuated by means of a cam link on the chain control device 39.

In the operation of the aforesaid individual end stop automatic control device, and as may be seen in Figs. 3 and 4 of the drawings, the arm 36 carries at its end adjacent to the end stops, a longitudinally extending finger member which is adapted to engage a projection on the individual stop lifting and lowering device 35 throughout the entire longitudinal movement of the latter as it is carried by the end stop spindle nut 31. It is necessary only, in order to understand the association of such automatic end stop device and the operating elements of this invention, to explain that, at the completion of the knitting of a stocking blank, the individual end stops 38 are raised relatively to the correspondingly active carrier bars by means of the devices 35 and 36. Of course, at such time the carrier bars are free to move independently of the end stop devices and it is customary to move these bars to their extreme outer positions in order to permit the pressing off of the blank from the knitting mechanism. The carrier bars then normally remain in this outermost position until such time as the narrowing mechanism and end stop devices are reset.

The rock shaft 37, the chain control device 39 and the means by which such elements are operated, form essential parts of the present invention and are described in considerable detail in the following description; the rock shaft 37 constituting a mere support for the device 36 and performing no part in the function of the individual end stop actuating mechanism.

Also mounted at each end of the knitting machine adjacent to the yarn carrier end stop mechanisms, are the so called narrowing heads, which effect the decrease in the distance between the narrowing or loop transfer points. In the usual operation of the machine at certain different points from the welt to the heel or toe portion, the width of the stocking is decreased to provide the known features of a full-fashioned stocking. The transfer points 40 are carried by longitudinally extending bars or rods 41, which have their ends terminating adjacent to the narrowing nuts 42, certain projections or shoes 43 on the nuts cooperating with adjacent studs 44 on the bars to transmit motion to the transfer points. As is usual, reversely threaded spindles 45 engage with each pair of the nuts 42 and upon rotation move such nuts toward and away from each other in unison.

This detailed description of the several essential elements of a flat knitting machine relates only to known mechanisms and is given to aid in the understanding of the present invention. Heretofore, operation of the various narrowing points and yarn carrier actuating devices has been effectuated through the automatic functioning of the machine only in the narrowing movement and, after the completion of each stocking blank, it has been necessary to manually retract the narrowing heads and yarn carrier end stop devices to their starting positions before initiating the knitting of a subsequent blank. Customarily, after a blank is pressed off the needles, the machine is held inoperative and each of the screw spindles 32 and 45 is manually turned back by means of hand cranks in association with such spindles.

It has been found desirable in line with the trend to completely automatically mechanize all the elements of the full-fashioned knitting machine, to devise a simple and efficient mechanism operated from the cam shaft or other moving element of the machine, by which the back-racking or resetting of the several narrowing devices is automatically accomplished without an interruption in the knitting.

In the herein disclosed embodiment of the invention, the narrowing and yarn carrier end stop actuating spindles 45 and 32, respectively, are rotatably journaled in bearing blocks 50 and 51, secured to certain fixed frame or bed elements of the machine at each end thereof. The spindles 45 and 32 are held from longitudinal movement by the blocks 50 and 51 and each projected beyond the end frame of the machine to receive thereon the devices by which such spindles are rotated.

As best seen in Fig. 8, the projecting end 55 of the narrowing spindle, has fixedly mounted thereon a set of ratchet discs 56 and the end 57 of the carrier stop spindle 32 has a similar set of ratchet discs 58 attached to it. These several ratchet discs as will be described, are peripherally toothed or notched in one or both directions and are intended through their operative engagement with automatically actuated pawls to impart the necessary rotation to the narrowing and yarn carrier stop spindles through each complete cycle of the machine operation.

In each set of the narrowing spindle ratchet discs 56, there is included one disc 59 adapted to cooperate with a pawl 60 carried by a bell crank 61 mounted axially of the spindle (see Fig. 12). The crank 61 is connected to the upper end of a lever or arm 62 secured to a vertically reciprocable yoked arm 63 as at 64. The yoke arm 63 has a stroke sufficient to cause the pawl 60 to advance the ratchet disc 59 two teeth equal to a distance of two needles. A similar ratchet disc 65 is provided in the set 58 on the carrier end-stop spindle 32, and this disc cooperates with the pawl 66 carried by one arm of a bell crank 67 rotatably mounted on the end 57 of the spindle 32. The other arm 68 of bell crank 67 is pivotally connected to the upper end of another lever or arm 70 of yoke arm 63. The teeth of the disc 65 are spaced such that, upon the upward stroke of the yoke arm 63, the pawl 66 will advance the disc 65 a distance of one tooth, or two needles.

The yoke arm 63 is carried at its upper ends by means of the bell cranks 61 and 67 and also by means of a connection 71 at the lower end 73 of said yoke arm to a lifter arm 72, such lifter arm forming a well known part of the narrowing mechanism of the "Reading" full-fashioned knitting machine and may therefore be described only briefly. The main cam shaft 16 of the machine is provided with a cam 75 slidable in and out of operative engagement with a cam roller 76 on the arm 72; such cam 75 being shifted with the cam shaft relative to the roller by suitable connections to the usual main chain motion device 78. The lifter arm 72 is pivoted at its front end to the machine frame and any rocking movement imparted thereto as by the cam 75 will cause the vertical reciprocation of yoke arm 63 and a consequent functioning of the pawls 60 and 66 to rotate the spindles 45 and 32 in their narrowing movement. As it is required that the narrowing movements of both the transfer points and the yarn carrier end stops be coordinated, there is provided a link 80 pivotally attached to corresponding projections 81 and 82 on the pawls 60 and 66, respectively, thus both pawls being insured of simultaneous operative engagement with the discs 59 and 65.

Other discs 85 and 86 are respectively provided on the spindle ends 55 and 57 and form a part of the previously mentioned disc sets 56 and 58 in which the several ratchet discs are united to each other and to their respective shafts. Cooperating with each of said discs 85 and 86 are spring pressed detents 87 and 88 respectively, carried at the lower ends of vertically moved plungers 89 and 90, which are mounted in upright extensions 91 and 92 on the journal brackets 50 and 51 for the narrowing and carrier end-stop spindles.

In operation, the detents serve to prevent any lost motion between the spindle shafts and their indexing mechanisms as for instance when the pawls are being drawn backwardly by the yoke arm 63 to engage the next succession of ratchet teeth. To prevent undue friction or wear in the parts and as especially adapted to the present novel back-racking mechanism, certain means are provided for automatically engaging and disengaging such detents with the ratchet discs 85 and 86. Referring particularly to Fig. 5, the plunger 89 carrying the detent 87 for resisting the movement of the narrowing nut spindle 45, is provided with a laterally projecting pin 95, which is engaged by a cam lever 96; the operation of such cam lever to be more fully described hereinafter, it being obvious that if such lever 96 be rocked in a counterclockwise direction about its pivot, the detent 87 will be lifted thereby and the disc 85 free to rotate. Manual means in the form of a pivoted lifter arm 97 is provided for the purpose of manually lifting the detent 87 as when the machine is being adjusted or regulated, this arm 97 remaining in its operative engagement at all times with the plunger 89, but in no way interfering with the automatic control of the detent 87.

Similarly, the plunger 90 and detent 88 of the narrowing end-stop spindle mechanism are manually controllable by a pivoted lifter arm 99. Means, such as a lateral pin 100 on the plunger 90 in engagement with a pivoted cam lever 101, are provided for automatically lifting the detent 87 at the proper time in the cycle of machine operation.

In the operation of a full-fashioned knitting machine, the main cam shaft through the medium of cam lugs on the main pattern chain is periodically and automatically actuated to establish connection between cam 75 and roller 76, and to thus rotate the two spindles 45 and 32 in their narrowing movement. The resetting of the spindles has in the past been accomplished by means of a hand crank engageable with the outer ends of the narrowing nut and the carrier bar stop spindle shafts.

These hand cranks have been retained in connection with the present novel mechanism in order to permit of certain manual adjustment between the two spindles as when changing the machine set up and are designated in the drawings by numerals 102, 102. Compression springs (not shown) tend to keep the couplings 103 on the crank and spindle hubs normally out of engagement.

The machine is operated in the well known manner in its plain knitting. During narrowing the machine is operated as caused by the intermittent actuation of the yoke arm 63 by the cam shaft as has been described. The pawls 60 and 66 are normally pressed toward engagement with the discs 59 and 65 and as the yoke 63 moves upwardly the spindles 45 and 32 are indexed in their narrowing movement. This relationship of parts prevails throughout the knitting of the stocking, i. e. from the point when the numerous instrumentalities herein disclosed and described are back-racked or reset to original positions and thenceforth until the stocking blank is finished. The interval, in a complete cycle in the operation of the knitting machine to complete a stocking blank, at which time the back-racking or resetting of the end stops and narrowing points is effected, as has been stated, is so coordinated as to take place after the start of the knitting upon the next blank. In other words, the present invention makes possible the complete actuation of all the machine instrumentalities in the time interval required to knit the courses of a stocking blank.

Not only are the narrowing rod and end stop devices of the present embodiment of the invention positively and automatically actuated, thus serving to enhance the efficiency of the machine, but the saving of the time interval necessary to manually operate the resetting of such mechanisms is made possible through the medium of the new and improved mechanism.

Figure 2:
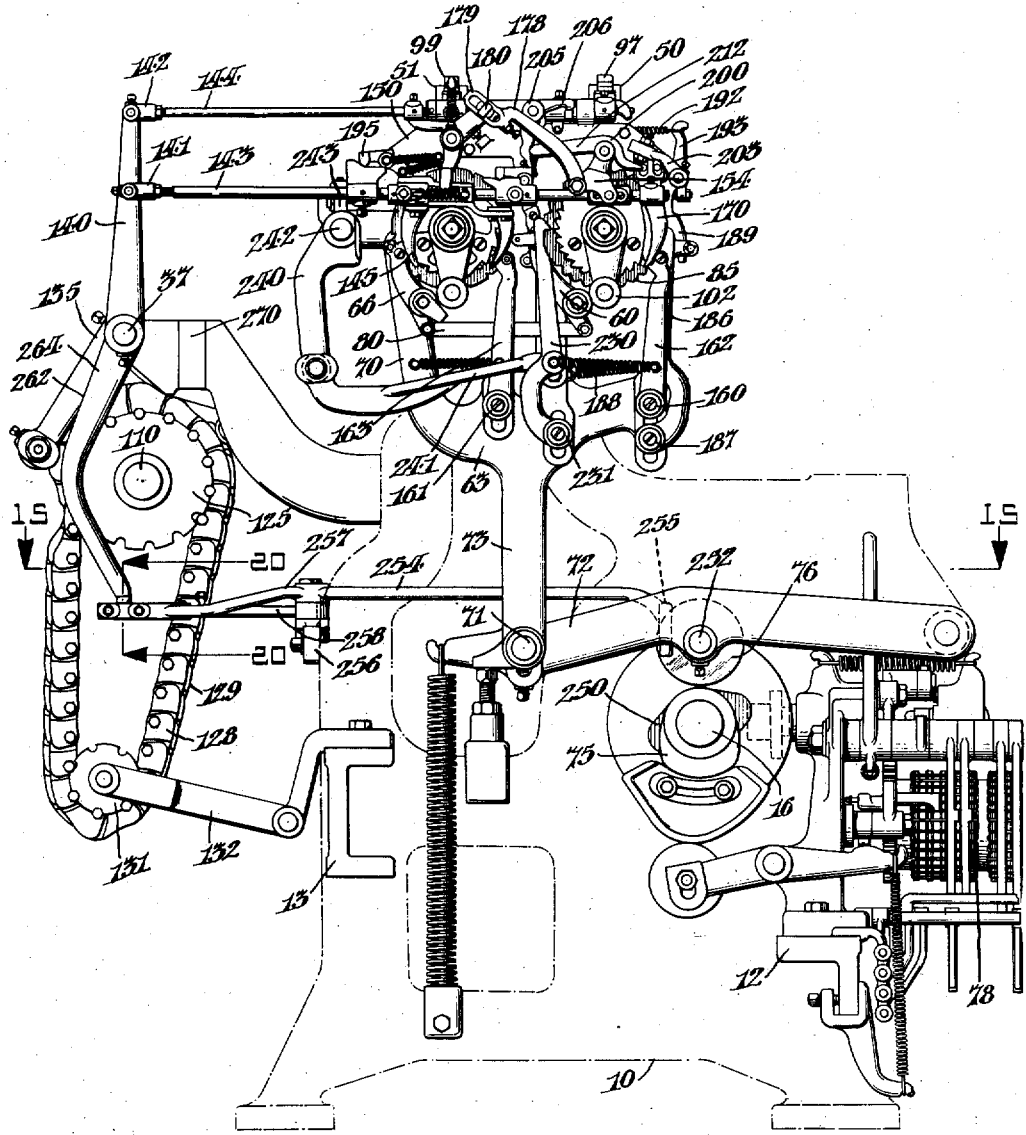
Fig. 2 is a left end elevation of the machine of Fig. 1 on an enlarged scale and with the machine frame shown only in dotted lines to clarify the illustration of certain portions normally covered by such frame.

In Figs. 2 and 7 there is shown an auxiliary control shaft 110 journaled in bearings at the rear of the machine. This auxiliary control shaft is provided to function as a control mechanism for certain of the automatic devices, as for example the pawl positioning cams of the resetting mechanism and the operating devices for the auxiliary stop mechanism to be described, and suitable connections are provided between the main cam shaft 16 and the auxiliary shaft 110 to intermittently rotate the latter.

In Fig. 7 is shown the crank arm 112 pivotally supported upon a shaft 113 carried by the main frame of the machine, this crank having at one end a portion for latching cooperation with a release lever 114 pivotally mounted about a vertical axis on the front rail 12 and having an arm 115 operatively connected at its lower end to a horizontal rod extending along the front of the machine to the main chain device 78 of the machine. The other end 116 of lever 112 is connected by a link 117 to an oscillating crank arm 118 supported by the auxiliary control shaft 110. The arm 116 has journaled therein a cam follower 119 which, when the crank arm is released by the lever 114, engages a cam 120 for operation thereby to move the link 117 back and forth and thus oscillate the crank arm 118 about its mounting.

Also carried upon the shaft 110 and fixed thereto, is a ratchet wheel or disc 122 which is engaged by a pawl 123 pivotally mounted on the arm 118. The cam 120 by reason of its contour, rocks the ratchet wheel through a distance equal to the pitch of a tooth of a sprocket wheel 125 carried by the auxiliary control shaft 110, this action imparting a clockwise movement to such control shaft.

A spring 124 attached to the back rail of the machine by a suitable hook, is attached to an extension 126 on the link member 117 thereby acting either to cause the roller 119 to follow the contour of cam 120 or to keep the same out of engagement therewith by holding the lower portion of arm 112 in contact with the release lever 114. It will be obvious that, by a proper positioning of selector buttons on the main pattern chain, the auxiliary control shaft may be intermittently actuated at any time during the rotation of the main cam shaft.

The auxiliary control shaft 110 is adapted to provide a control means, operated by, but independently of, the main cam shaft, for effecting the automatic actuation of the spindle resetting device, and also for controlling the movements of the individual end stop lifting mechanism and of the auxiliary stop device. Suitable variable pattern devices or chains 128 and 129, are carried by sprocket wheels 125 and 130, respectively, (see Fig. 4), and these chains are held in operative position on the sprocket wheels by means of idler wheels 131 carried by brackets 132 secured to the back rail 13. Each chain comprises a series of links, the upper surfaces of which provide cams for engagement with certain of the control devices, as will be presently described.

The function of a full-fashioned knitting machine and its cyclic control main pattern chain is so well understood that it is sufficient to say that each of the chain links represents a plain or narrowed course of the article knit thereby and that such chain is so arranged and provided with cam buttons or projections that the controls actuated thereby are brought into play at the proper time intervals. Likewise, the chains 128 and 129 and their construction are sufficiently well known as to need no detailed description.

There is, however, an important feature in the present arrangement and use of the chains 128 and 129 that forms a part of this invention. The rock shaft 37 described above, has fixed thereto a bell crank lever 135 carrying at the extremity of its arms 136 and 137 oppositely disposed cam rollers 138 and 139. The chains 128 and 129 are mounted at each side of the arm 135 and, as will best be seen in Fig. 9, the rollers 138 and 139 extending oppositely to one another overlay the surface of such pattern chains and contact with the cam links thereof. By this construction a positive drive may be imparted to the rock shaft 31 throughout its entire movement. This feature is found to be very important in providing a precision actuating device for the control mechanism of the resetting device. The cam links on the two pattern chains as will be best seen from the diagrammatic view of Fig. 24, are complementarily formed.

The lengths of chains 128 and 129 are, in this instance, shorter than that of the main pattern chain of the machine. Although each chain makes a complete circuit in a full cycle of the machine's operation, the number of operations required of the chains 128 and 129 is considerably less than required of the main chain, wherefore, it will be understood that the supplemental pattern chains 128 and 129 are inactive during a considerable part of the knitting of the blank.

As referred to above, the rock shaft 37, has fixed thereto an oscillating arm 140, having attached to its outer end through suitable forked links 141 and 142, a pair of laterally extending bars or rods 143 and 144, respectively. Upon these two bars are carried the several cams and other mechanisms adapted to cooperate with the pawls and ratchet wheels of the spindle resetting mechanisms. It will be obvious that the rod 143 is reciprocated transversely of the machine in a substantial horizontal line through its connections with the arm 140, rock shaft 37 and crank lever 135 by means of the auxiliary pattern chains 128 and 129.

As will appear from the following detailed description of this mechanism, the reciprocating rod 143 has four distinct and separate positions in its operative movement and in each of said positions it moves the cam devices carried thereby to produce a different set of results in the resetting pawl and ratchet mechanism.

In Fig. 2 the spindle resetting mechanism is shown in its condition as when the yoke arm 63 is operating to index the spindles 45 and 32 in their forward or narrowing movement, the pawls 60 and 66 being shown in engagement with the ratchet wheels 59 and 65. Cooperating with the pawl 66 and carried by the rod 143 is a depending cam 145, this cam engaging a laterally projecting stud 146 on the pawl 66.

A cam element 147 pivotally mounted upon bracket 150 (to be described) has a depending cam 148 adapted to engage a stud 149 on the pawl 60. Secured to the reciprocating bar 143 is a sleeve 157 provided with a cam surface 158 which is designed to cooperate with an operating extension of the cam element 147. This extension has a cam engaging finger 159 which, as the cam 158 is moved with the bar 143 causes a resultant movement of the cam toward or away from the stud 149.

In the position shown in Fig. 6, the two cams 145 and 148 are out of engagement with their respective studs and the pawls 66 and 60 are in operative relationship with the ratchet discs, whereas in Fig. 10 the bar 143 having been shifted to the left and consequently bringing the cams 145 and 148 against the studs on the pawls 66 and 60, the forward ratcheting of the spindles 32 and 45 is stopped and any further reciprocating movement of the yoke arm 63 has no effect upon these two pawls.

A bracket structure 150 adjacent to the ends of spindle shafts 45 and 32, is secured to the brackets 50 and 51 on the end of the machine by bolts 151, and this bracket structure provides a mounting for numerous other instrumentalities of the spindle resetting mechanism. On the bracket 150 is provided at 152, a lateral projection supporting a bearing for a fulcrum stud 153, which has mounted thereon a bell crank arm 154, one leg 155 of which is forked to straddle and engage a sleeve 156 carried by the bar 143. Any motion imparted to such bar, will, of course, cause the crank 154 to oscillate about its pivot 153.

Before proceeding with further details of the mechanisms carried by or actuated by the reciprocating bar 143, a description of the auxiliary or supplemental pawls will now be given. Pivotally mounted upon the yoke arm 63 at 160 and 161, are a pair of back-racking pawls 162 and 163, respectively. The pawl 162 is adapted to engage a ratchet disc 164 forming a part of the set 56 on the narrowing nut spindle shaft, and the pawl 163 is adapted to engage with a ratchet disc 165 secured to the carrier bar end-stop spindle end 57 and forming a part of the set 58. Tension springs 166 and 167 attached between studs on the yoke arm 63 and two pawls 162 and 163, respectively, tend to force the upper ends of such pawls into engagement with their cooperating ratchet discs and thus any vertical upward movement of the arm 63 with the pawls in such condition will bring about a counterclockwise rotation of the spindle shafts 45 and 32. The detents 87 and 88, which as described above, cooperate with disc wheels 85 and 86, act to prevent backward movement of the discs 164 and 165 as the arm 63 moves downwardly and the pawls carried thereby are dragged over the surfaces of such discs.

The two pawls just referred to and constituting a part of the mechanism for back racking or resetting the narrowing bar and end stop spindles, are shown in operative relation in Fig. 10, wherein the reciprocating bar 143 is moved to the left and the forward racking pawls 60 and 66 thus inoperatively positioned. Another cam 170 fixedly secured to the bar 143 having its engaging surface adapted to cooperate with a laterally projecting stud 171 on the pawl 162 controls the operating position of the latter. It will be seen that as the bar 143 is moved to the left of the several figures to inoperatively position the forward racking pawls, such movement will also carry the cam 170 away from the pin 171 and thus permit the spring 166 to draw this latter pawl into engagement with the disc 164. Another cam 173 carried upon a slide 174 on the bar 143, projects into the path of a stud 175 projecting from the pawl 163, see Fig. 13. Similarly, if the cam 173 be moved to the left of Fig. 6, the pawl 163 is permitted to operatively engage its ratchet disc on the carrier bar end-stop spindle.

As will be described, the cam 173 is at one time in the machine's operation, independently movable with respect to the cam 170. The slide 174 is normally immovably held upon the bar 143 against a stop 175' by means of springs 176. Attached to the end 177 of bell crank 154, is a link element 178 having its other end 179 provided with an elongated slot in which is received a stud 180 projecting from an arm 181 (see Fig. 19) of another bell crank 182. A suitable adjusting screw 183 is supported by the link 178 to regulate the contact between such link and stud 180. The other end 184 of crank 182 is bifurcated and straddles the slide 174, a spring 185 being employed to hold the stud 180 against the screw 183. Movement of bar 143 to the left still further than the position shown in Fig. 10 (see Fig. 11) will cause the crank 154 to rock about its pivot forcing the link 178 outwardly and thus rock the crank 182 in a counterclockwise direction. This movement of the crank carries the slide 174 to the right in opposition to the compression springs 176, and thus disengages the pawl 163 from its back racking engagement with the disc 165 on the carrier bar end-stop spindle.

The condition just described and as illustrated in Fig. 11, is in force when it is desired to back rack the narrowing nuts a further distance than that of the carrier bar end-stop nuts. As will be explained, this takes place near the beginning of knitting a stocking blank in order to carry the narrowing points beyond the knitting field to insure proper clearance for the operation of the transfer bar device. At such time the yoke arm 63 continues its reciprocation until the narrowing nuts have been drawn to their extreme separated position.

At the time in the knitting of the stocking blank, which ordinarily takes place near the completion of the welt, when it is desired to position the narrowing points operatively with respect to the knitting needles, the narrowing spindle 45 must be turned in its forward or narrowing direction independently of the spindle 32 and this being a still different condition from that just described in connection with the showing of Fig. 11. To accomplish this desired result through the medium of instrumentalities forming a part of the present novel automatically operated resetting mechanism, there is provided still another pawl 186 pivoted at 187 to an extension of the yoke arm 63, a tension spring 188 attached to such pawl tends to force the same into engagement with the disc 59. This latter constitutes, as has been described, the element cooperating with pawl 60 for advancing the narrowing nuts. A cam member 189 pivoted at 190 to the bracket 150 engages with a lateral stud 191 on the pawl 186 to keep the latter normally swung out of engagement with disc 59. A spring 192 connected between a fixed part of the machine and a projection 193 on the cam 189 tends to yieldingly force the same in a counterclockwise direction.

In Fig. 9 is illustrated the condition just referred to. At this time all of the pawls, e. g. 60, 66, 162 and 163 are moved out of engagement with their respective discs and the pawl 186 is in position to operate with the ratchet disc 59. This arrangement of parts is attained by moving the reciprocating bar 143 to the extreme right of such figure and in this position, through the various instrumentalities of the resetting mechanism, each of the aforesaid pawls is rocked about its respective pivot.

Fixed to the bar 143 is a cam element 194 having its cam surface engaging a projection 195 of a rock arm 196 which is fixedly mounted on a stud 197 pivotally journaled in an extension of the bracket 150. Also fixed to the stud 197 is a depending cam 198 which is adapted to be projected in the path of a laterally extending stud 199 on the pawl 66, wherefore it will be seen that if the cam projection 195 of member 196 be raised by sliding the cam 194 to the right, from the position of Fig. 6 to the position of Fig. 9, the cam 198 will swing in a clockwise direction and carry with it the pawl 66 to inoperative position.

As has been described, the pawls 66 and 60 are interconnected by means of a link 80 and thus the movement of pawl 66 will be transmitted to the pawl 60. The pawls 162 and 163 will of course be moved to inoperative position through their engagement with cams 170 and 173, respectively, as such cams are moved to the right along with bar 143. The sleeve 156 also carried by bar 143 through its contact with arm 155, will cause the bell crank 154 to swing in a counterclockwise direction about pivot 153.

Secured to move with the crank 154 is a lever device 200, having one end 201 engaged with a projecting adjustable stud 202 of a lever 203 fixed to the pivot 190 to move in conjunction with pawl 186. Thus, as the bell crank 154 is moved counterclockwise the lever 201 raises the lever 203 rocking the latter clockwise and permitting the pawl 186 to swing into engagement with ratchet disc 59. Means are also provided to lift the detent 87 from the ratchet disc 85 at the time the pawl 186 is operating, this means constituting a pivoted bell crank 205 mounted on bracket 150 having one arm thereof 206 engaged with a projection 207 from a sleeve 208 fixed to a rock shaft 209. Also secured to the shaft 209 is the cam lever 96 which engages with the stud 95 on the plunger 89. To effect the operation of bell crank 206, the other arm 210 thereof is provided with a cam surface 211 engageable by the second arm 212 of the bell crank 200. As seen in Fig. 9, as the bar 143 is shifted to the right, the end of arm 212, riding along the surface of cam 211, will cause the arm 206 to depress the projection 207 and thus lift the detent, through the several described connections, from engagement with its ratchet wheel 85.

This mechanism, involving the bell cranks 200 and 206, provides for a periodic release of detent 87 under other operating conditions of the machine, as for example in Figs. 10 and 11, the bell crank 154 is swung clockwise whereby the arm 212 rides along another cam surface 214 on the arm 210, this movement also producing a depression of projection of 207 and rocks the cam lever 96 to raise the plunger 89.

There are also provided in connection with the automatic spindle resetting mechanism, certain devices for raising and lowering the detent 88 which holds the carrier bar end-stop spindle from rotation. As has been described, the plunger 90 is liftable by means of a cam lever 101 pivotally carried about a stud 220 anchored in the bracket 150.

Referring particularly to Figs. 4 and 6, the lever 101 is provided with an extension 221 which is engaged by a tension spring 222 tending to normally rock the lever 101 to raise the plunger 90. The reciprocating bar 144 previously described as being actuated by the lever 140 on rock shaft 37, carries thereon a sliding cam element 224 having a cam surface 225 with an indentation 226 therein. The lever 101 has integral therewith an extending cam follower or roller 227 which is adapted to be held into contact with the cam member 224 through the medium of spring 222. At all times, except when actually back-racking or resetting the spindles 32, the cam 224, although it moves with the bar 144, will not affect the lever 101, and the plunger 90 and detent 88 will be held in engagement with the ratchet 86 by means of spring 222. Figs. 17 and 18 illustrate the two extremes in the position of cam 224 and the resultant condition of lever 101.

It is ordinary in the operation of a full-fashioned knitting machine, particularly at the heel or toe portion of a stocking blank, not only to successively narrow the courses as by reducing the number of loops therein, but also simultaneously to conduct such narrowing with a successive decrease in the number of transfer points of the narrowing mechanism.

The width of the stocking blank during the narrowing operation at the knee and above the ankle, is decreased four loops (two at each side) at every operation of the narrowing mechanism. In the narrowing of the heel tabs, or the like, after the narrowing points have transferred the loops inwardly of two needles (through the functioning of pawl 60 and ratchet 59) and replaced the loops on the needles, another pawl 230 of the narrowing mechanism turns the narrowing nut spindle backward one tooth as the yoke 63 moves down, thus pulling the narrowing points backward a distance equal to the pitch of one needle.

The pawl 230 is pivotally mounted at 231 on the yoke arm 63 and is adapted for engagement with disc 164 to back rack the narrowing nut spindle. During this particular operation, the pawl 230 is urged toward the disc 164 at the same time the pawl 60 is acting in the upward movement of yoke 63 to advance the narrowing spindle in its narrowing movement. When such yoke arm 63 is moved downwardly, the pawl 230 returns such spindle in the opposite direction. As constructed, means are provided whereby to permit the pawl 230 to engage only one tooth of the disc 164 in such downward movement; whereas the pawl 60 has moved the disc 59 the distance of two teeth in its operating movement.

As has been described above, the cam 170 which normally engages pin 171 on pawl 162, at the time the rod 143 is moved to the left as in Fig. 11, fails to provide means for preventing the pawl 162 being pulled inwardly by means of spring 166. To supplement the holding action of cam 170 an auxiliary cam 228 fixed to bracket 150 extends downwardly into the path of pin 171, whereby at all times irrespective of cam 170 the pawl 162 is limited in its inward movement. As seen in the drawings, the lower end of cam 228 may have a lateral cam surface 229 which engages the pawl 162 in the downward movement of yoked arm 63 to prevent the engagement of such pawl with the ratchet disc 164 before the proper position is reached in its subsequent upward movement.

As will be seen in the drawings, a cam element 232 is provided in connection with cam 148 and serves to engage a projection stud 233 on the pawl 230, whereby to hold such pawl away from the ratchet disc for a distance equal to one tooth and to allow it to engage the ratchet disc for a distance of one tooth.

The pawl 230 as has been described, functions at such time as when it is desired to control the narrowing nuts to transfer the loops two needles inwardly and to thereafter retract the narrowing points one needle. During the time that the pawl 230 is inoperative, it is held away from the ratchet wheel 164 through its connection to a rock arm 240, by means of a link 241. The arm 240 is pivotally mounted upon a shaft 242 carried at the rear of the machine by extensions 247 of brackets 51, and has an integral extension 243 coextensive with the shaft 242. Upon such extension is mounted a cam 245 which cooperates with a laterally extending cam member 244 fixedly carried by the carrier bar end-stop nut device 31.

In the operation of the machine, it is, of course, understood that the carrier bar end stop device is moved longitudinally of the machine by means of the narrowing index movement of spindle 32, and at such time the cam 244 is slidably movable relatively to the extension 243, and the cam 245 thereon. The spring 166, urging the pawl 230 toward the ratchet disc 164, serves through its incident chain of connections to press the cam 245 toward the cam 244. The cam 245 is provided with a stepped or relieved portion 246 which cooperates with the cam 244 at the time when the narrowing device has been indexed to the position to operate upon the heel tabs, or other portions of the stocking, and requires the utilization of the backward moving pawl 230. As will be seen in Fig. 3, the end stop device 31 has been moved to the right, the cam 244 being carried thereby, and the stepped portion 246 of cam 245 has been reached, thus permitting the extension 243 to move outwardly and the lower end of arm 240 to be swung inwardly. It will be understood that the cam element 244 is adjustable relative to its mounting on the nut 31, and that also the cam 245 carried by the extension 243 may be adjustably slidable therealong, and in this manner the mechanism for permitting the movement of pawl 230 into operative position, may be regulated to function at any time during the longitudinal movement of the narrowing mechanism.

It has been explained that the reciprocating yoke arm 63 of the narrowing mechanism is intermittently vertically moved by means of its connection to the pivoted rock arm 72 and the connection of the latter through roller 76 and cam 75 to the main cam shaft 16 of the machine. These parts are all well known in the "Reading" knitting machine and are adapted in their use with the devices of this invention, to actuate the yoke arm 63 and pawls carried thereby in the narrowing index movement of such mechanism. The cam 75 provides one eccentric lobe and therefore during one complete rotation of the cam shaft 16, the yoke arm 63 is moved up and down one time only. For all normal intents and purposes, this single movement of the yoke arm 63 and indexing devices carried thereby, is sufficient to permit the same to perform their required functions, which are, of course, coordinated with the knitting mechanisms.

To speed up the operation of the back-racking or resetting devices of the present invention, it is found desirable to provide a double lobed cam 250 fixed to the cam shaft 16 and a second cam roller 251 carried upon an extension 252 of the shaft for mounting the roller 76 in the rock arm 72. It will be obvious that if the roller 251 be operatively positioned with respect to the cam 250, the rock arm 72 will be oscillated two complete movements during each rotation of the cam shaft 16. Means in the form of a pivotally mounted arm 254, having one end forked, as at 255, to straddle the sides of roller 251, is provided to shift such roller longitudinally of the main cam shaft and thus into position to be engaged by the cam 250.

The arm or lever 254 is pivotally mounted upon an extension 256 carried by the frame structure of the machine and has integral therewith, a rearwardly projecting arm 257. Also carried by the extension or bracket 256 and fixed thereto, is a rearwardly projecting arm 258 coextensive with the arm 257. The outer ends of these two arms are spaced slightly apart and provided with facing surfaces between which is adapted to move the control element for rocking the arm 254 about its pivot.

As seen in Figs. 15 and 16, the arm 258 has thereon a straight cam face 259, and the arm 257 has on its facing surface a cam element 260 provided with a recessed portion 261. In the normal position of the arm 254, i. e. when the narrowing mechanism is inoperative or being controlled by means of the cam 75, the cam control device 262 operated between the cams 259 and 260 is positioned in line with the recessed portion 261. It will be apparent that if the device 262 be moved in either direction relatively to the cam 260 and its recessed portion 261, the arm 257 will be moved away from the arm 258, which is fixed to the machine, and in consequence the roller 251 will be moved above the cam 250.

Figure 20:
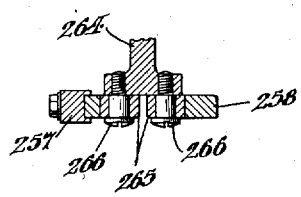
Fig. 20 is a view taken on line 20—20 of Fig. 2.

The control device 262 above referred to, comprises, as is seen in Fig. 20, downwardly extending arm 264 having a pair of rollers 265 secured by screws 266, to its lower end. These rollers 265 are positioned transversely of the arm 264 to provide rolling contact between such arm and the cam surfaces of arms 257 and 258.

The arm 264 is fixed to the rock shaft 37 and hence any oscillating movement imparted to the latter from its position of Fig. 15, will cause the device 262 to spread the cams 259 and 260. In the present arrangement, the rock shaft 37 is actuated only when the spindle resetting control elements are operated, as by moving the arm 140 to position the bar 143 and devices carried thereby, relatively to the resetting mechanisms. If the machine is actuated to either back rack the narrowing nut and carrier bar end-stop spindles, or to independently operate either one of such spindles as is sometimes desired, the rocking of shaft 37 to produce such condition will cause a corresponding movement in the arm 264 and hence the double lobed cam 250 is operatively engaged to reciprocate the yoke arm 63.

The movement of the cam roller 251 in no way affects the position of roller 76, and likewise the shifting of the cam shaft 16 and cam 75 does not affect the inoperative relationship between roller 251 and cam 250.

There is provided in association with the narrowing mechanism and the novel indexing and resetting devices of the present embodiment of the invention, certain improved means adapted to prevent accidental operative engagement of the index pawls 60 and 66 with ratchet wheels 59 and 65, during the time the main cam shaft 16 is being shifted to actuate the picot transfer bar, as at the middle of the welt, in the manner well known in the operation of a full-fashioned knitting machine.

As is illustrated in the drawings, the pawl 60 is provided with a finger 330 adapted to cooperate with an extension member 331 fixed to the narrowing nut 42, see Figs. 3 and 14. The extension element 331, when the narrowing nuts 42 are racked to their outermost extremities, in the condition seen in Fig. 27, projects into the path of finger element 330 and serves as an abutment or holdout device to prevent the engagement of pawl 60, and pawl 66 linked thereto by member 80, regardless of the operation of the main cam shaft 16 and the yoked arm 63. The extension member 331 is shown in dot-and-dash line in Fig. 14 in its operative or holdout position with respect to pawl 60. It should be explained, in the operation of a full-fashioned knitting machine of the illustrated "Reading" type, that the main cam shaft 16 is shifted and actuated to effect the proper cooperation of the transfer bar mechanism at the time of performing the picoting. Hence it will be seen that, if the narrowing indexing mechanism including the pawls 60 and 66 are normally positioned relative to the ratchet discs on the spindles 45 and 32, the shifting of such cam shaft and its resultant action on the yoked arm 63 will produce an undesirable indexing of these spindles. The simple expedient explained above in the form of extension 331 serves to overcome this difficulty.

Mention has been made several times in the foregoing, of the provision of an auxiliary stop device to be used in connection with the resetting mechanisms of this invention. It has been found essential during the operation of such spindle resetting device, at times when the knitting mechanisms continue to operate to produce an article, to provide a new and improved auxiliary stop for controlling the reciprocative movement of one or more of the carrier bars which are entirely disconnected from the ordinary end stops 38 of the machine.

There is shown in Figs. 21 to 23, inclusive an arrangement of parts, mounted on the center bed 15 and a back bar 270 of the machine, comprising a selectively operated auxiliary stop mechanism controlled from a pattern cam chain 271 passing over a sprocket wheel 272 on the auxiliary shaft 110. In these figures, the several carrier bars 26, are shown in their normal position and one or more of the same has secured thereto, spaced stop lugs 274. Auxiliary stops 275, adapted to cooperate with the lugs 274 to limit the longitudinal movement of the carrier bars 26, are slidably carried by a housing structure 276 mounted, adjacent to the upper surfaces of the carrier bars, upon an arm 277 fixed to the back bar of the machine. These auxiliary stops 275, are yieldingly pressed toward the carrier bars by means of tension springs 278 connected to a projecting lug 279 on such stops and a fixed pin 280 on the housing 276. Means for lifting the stops 275 away from the carrier bars consists of a lifting bar 282 extending through an opening in the housing 276 and provided with lateral extensions 283 adapted to engage complimentary lateral projections 284 on the stops 275. The bar 282 is lifted relatively to the housing to move the auxiliary stops through a linkage connection 286 between its outer end 287 and the housing and a linkage connection 288 between its other outer end 289 and a suitable portion of the housing or support arm 277.

Means for rocking the aforesaid linkage structure, comprising links 286, 288 and bar 282, may consist in the illustrated embodiment of the device, of a rock arm 290 pivotally mounted to the back bar 270 of the machine and having, at one end 291, a cam roller 292 adapted for engagement with the cam elements of the control chain 271, the other end of arm 290 being connected by a link 293 to the link 288. Tension spring 294, extending between the arm 290 and a fixed portion of the bracket arm 277, tends to keep the cam rocker 292 in contact with the control chain 271.

The auxiliary control shaft 110, as has been described, is actuated by means of control buttons on the main pattern chain, and through suitable connections to the main cam shaft. It is to be understood that other buttons on the main pattern chain are suitably provided to cause the auxiliary shaft 110 to bring the cam elements of chain 271 to their operative position, relatively to rock arm 290, to permit the raising and lowering of the auxiliary stops at the proper time.

It is believed that the foregoing presents a comprehensive detailed description of the several operating elements of the novel spindle resetting device, and their conjunctive association with the mechanisms of a straight knitting machine. As briefly outlined in the preamble to this specification, the invention contemplates the operation of a full-fashioned knitting machine, in such new and improved manner, as to permit the complete actuation of all of the several control elements of such a machine during the time required only to completely knit the courses in a stocking blank.

The invention, in one form, provides an automatically operated resetting or back-racking device for the narrowing and carrier bar end stop spindles, which not only functions through the medium of structural cam shaft elements of the machine, but also accomplishes this desirable mechanical resetting at an increased speed.

It is also an important feature of the present invention to provide an auxiliary stop device which permits the functioning of the yarn carriers independently of the regular end stops of a straight knitting machine. Such auxiliary stops make possible the continuing of the knitting function of the machine directly after a blank has been pressed from the knitting needles and before the narrowing mechanisms or other devices have been reset to original position.

To briefly summarize the operation of the devices described above, reference is made to Figs. 25 to 30, inclusive, with a view to properly coordinating the diagrammatic illustrations thereof with certain important time steps in the production of a full-fashioned stocking blank. Each of these Figs. 25 to 30, shows several mechanisms of a knitting machine, such as the needles, the narrowing points, the narrowing bars, the narrowing nuts, the narrowing spindle, the yarn carrier bar, the carrier bar end stop device and its spindle, and the auxiliary stop device.

In Fig. 25 is illustrated the position of the aforesaid knitting machine elements at the completion of the knitting of the blank, i. e. with the narrowing nuts 42 and the carrier bar end stops 38 at their innermost positions. From the position of the parts seen in Fig. 25, it is normally required that the end stop devices 30 and the narrowing nuts 42 be reset to their starting position (as for example like shown in Fig. 27), this being necessary to provide for the full traverse of the yarn carrier at the starting or welt portion of a stocking blank.

Fig. 26 illustrates the change in the relationship of these parts, which may be effected directly after the stocking blank is pressed off the needles, that makes possible the starting of the knitting of the next blank prior to the resetting of the narrowing and carrier end-stop spindles. It is in this position that the auxiliary stop devices 275 are actuated to operatively engage one or more of the carrier bars in such manner as to permit the latter's cooperation with the knitting mechanisms, and when such carrier bars may be operated independently of their ordinary association with the yarn carriers end stops.

As seen in Fig. 26, the end stop spindles 32 and nut 31 mounted thereon, are in their innermost position and the end stops 38 are disengaged from the carrier bar 26; the narrowing nuts 42 being in the same position as seen in Fig. 25.

From the position of the parts seen in Fig. 26, and as described hereinbefore, the resetting of the end stop and narrowing spindles, is accomplished directly upon the continued operation of the machine after the start of the new blank.

Fig. 27 illustrates the carrier bar end stop nut 31 in its retracted or starting position, the narrowing nuts 42 in their outermost position, the individual end stops 38 lowered into operative position and the auxiliary stop 275 out of engagement with the carrier bar 26.

It will be understood that the changes in the relationship between parts as illustrated in Figs. 25 to 30, are automatically attained through the function and operation of the several new devices provided by this invention in the manner described above.

Fig. 28 illustrates the position of the several parts described in connection with Fig. 27 but shows the narrowing nuts 42 and narrowing points 40 moved to operative condition relative to the knitting field. At this time the end stop devices 30 and spindles 32 remain stationary and the narrowing nut spindles 45 are indexed inwardly by means of the pawl 186 and associated mechanism, as described.

Fig. 29 illustrates the same parts at such time in the knitting of a stocking blank as when the narrowing mechanism has been moved inwardly just prior to the knitting of the heel.

In Fig. 30 is illustrated a still further change in the relationship of the same parts, which may be attained through the automatic functioning of the present improved spindle resetting and actuating devices. This figure shows the carrier bar end stop devices 30 in the same position as found in Fig. 29, while the narrowing points have been back-racked or moved outwardly of the knitting needles approximately four needles on each side. The arrangement of such spindle resetting operating elements for permitting this four needle back-racking of the narrowing points independently of the yarn carriers, is best seen in detail in Fig. 11.

In further explanation of the operation of the machine and in connection with the diagrammatic showing of the Figs. 25 to 30, inclusive, a brief résumé of the steps required to knit one complete stocking blank will now be given: In starting a stocking blank, assuming the machine parts to be in the position illustrated in Fig. 26, the welt thread carrier is moved by the known friction box of the machine to operative position with the knitting needles, and prior to the turning or completion of such welt, the narrowing nuts and carrier bar end stops are racked back through the actuation of pawls 162 and 163. During this operation, a button on the main chain has operated the auxiliary pattern chains 128 and 129 to rock the shaft 37. After the carrier bar end stops have reached the outermost operative position relative to the knitting field and, when at such time it is desired to carry the narrowing points beyond the knitting field, a further movement is given to the rock shaft 37 to disengage the pawl 163 and to hold all of the pawls from their contact with the spindle turning device, with the exception of pawl 162.

The next step in the knitting of the stocking blank, is to bring about the operation of the transfer bar or picoting element and, after this, the narrowing points may be moved forwardly into the plane of the knitting field, this being done by means of the pawl 186. The machine then completes the knitting including the narrowing in the regular manner. At the heel tabs of the blank, it is normally required that the number of loops picked up by the narrowing transfer points be less than the number in the leg or knee portion of the stocking, and hence before such mechanisms are permitted to function, the narrowing points are back racked as has been described, approximately four needles; the knitting then continues and the heel tabs are completed after which the blank is pressed off the needles.

At this time, in order to permit the machine to be continued in its knitting operation without first resetting the end stops and narrowing nuts, the auxiliary stop mechanism is brought into operation through a further actuation of the auxiliary control shaft, and immediately thereupon the blank is started and the operation is continued as just described.

In Fig. 24, a stocking leg blank is diagrammatically shown along with pairs of chains 128 and 129 (two pairs of chains being illustrated so as to represent the control mechanism for the spindles at each end of the machine), and, to facilitate the ready understanding of the same, certain points along such blank are tied in with the approximate positions of the above described mechanisms, in their essential operations. The blank comprises the welt "W", the leg "L", and the heel or tab portions "T".

The line 300 indicates the course in the knitting cycle wherein the blank is "pressed-off". This line 300 is shown at both the bottom and top of the diagram as the machine control elements are in the same position at such indicated points. Another line 301 represents the next succeeding course at which is produced the first course of loops in the start of the stocking welt. Between courses 300 and 301, the auxiliary cam shaft is actuated to bring about the positioning of the auxiliary stop mechanism operatively with the welt yarn carrier.

Simultaneously with or immediately subsequent to the starting of the knitting, cams 310 on the chains 128 and 129 are brought, through the effect of a button on the main pattern chain, into operating contact with the crank arm rollers 138 and 139 to move the arm 140, bars 143 and 144, and the devices controlled thereby into the positions illustrated in Fig. 10 whereupon the motion of the machine in knitting causes the spindles 32 and 45 to be reset.

At 302 the line indicates the position at which time the parts 140, 143 and 144, are moved to the position shown in Fig. 11, by means of a cam 311, to permit the independent rotation of spindle 45, thus retracting the narrowing points beyond the knitting field (as seen in Fig. 27).

As soon as these points are in the extreme outer position, which has required only relatively few courses in the knitting, as the double lobed cam 250 moves such points four needles at every rotation of the main cam shaft, another cam 312 again changes the relationship of the control elements of the back-racking mechanism, as is shown in Fig. 2, and represented in Fig. 24 by line 303.

From this point the knitting is continued until after the welt is turned and the leg is started. It is, however, required that the narrowing points be now moved into the knitting field and the point where this operation takes place is denoted by line 304. The resetting and spindle indexing mechanisms are then in the position seen in Fig. 9, a cam 313 being provided on chains 128 and 129 for actuating the rock shaft 37 at this time.

As soon as the narrowing points are brought to the knitting field, a line 305 indicating such place on the blank of Fig. 24, a cam 314 restores the indexing and resetting mechanisms to the condition of the showing of Fig. 2. Then the regular knitting including the narrowing of the knee and leg indicated at "N", in Fig. 24, is continued until the heel tab portion is reached.

In narrowing the heel tabs it is desirable that fewer loop-transfer points be employed than in the leg narrowing: accordingly, at the position indicated by line 306, the chains 128 and 129 bring a cam 315 into operation to move the indexing and resetting mechanisms to the position shown in Fig. 11. At this time, as has been described in the above, these narrowing transfer points are moved back four needles, and this operation requiring only two courses in the knitting.

Line 307 in Fig. 24, represents the time when the cam 316 repositions the indexing and resetting mechanisms to the relationship found in Fig. 2. From this point on, the chains 128 and 129 perform no further function and the indexing mechanism continues in the aforesaid last noted arrangement until the position 301 is again reached.

A line 308 is shown in Fig. 24 to denote the approximate point in the heel tabs at which time the pawl 230 is brought into operating condition in the assemblage through the means described in connection therewith in the above.

It should be noted that, at the position 301, through the actuation of the auxiliary control shaft of the machine, the chain 271 and the mechanism controlled thereby are simultaneously actuated and the auxiliary stops 275 lowered into operating position with respect to one of the yarn carrier bars 26. At the time the course indicated at 302 is reached, the regular carrier bar end stops of the machine are repositioned, and the auxiliary control shaft is then further actuated to cause a lifting of the auxiliary stops 275.

The mechanism thus provided by this invention is relatively simple and free from complications so that the same may be readily combined with known types of straight knitting machines. Moreover, it will be apparent from the foregoing description that we have accomplished the objects primarily stated and that our invention constitutes a major improvement in machines for producing full-fashioned knit stockings.

Accordingly, the improvements herein specifically shown and described, by which the desired results are obtainable, can be modified and changed in various ways without departing from the spirit and scope of the invention as hereinafter claimed.

We claim:

1. A straight knitting machine comprising a yarn carrier bar, stop devices engageable with said bar to limit its coursewise movement, means for moving said stop devices to reduce the said coursewise movement, means for disengaging said stop devices from the bar, means for resetting said stop devices, and means including an auxiliary stop mechanism for controlling said carrier bar to move coursewise to its greatest operative extent during the resetting of the said stop devices, and means for causing said resetting means to operate during initial operations of knitting a fabric.

2. The combination in a straight knitting machine of a reciprocating yarn carrier bar, end stops selectively engageable with the ends of said bar, means for adjusting said stops relatively to each other to reduce the coursewise movement of said bar, means for resetting said stops, means including an auxiliary stop mechanism for controlling said bar to move throughout its full operative extent during the resetting of said end stops, and means for causing said resetting means to operate during initial operations of knitting a fabric.

3. A straight knitting machine comprising knitting mechanism, a reciprocating yarn carrier, narrowing transfer points, end-stop means for automatically reducing the travel of said yarn carrier and for simultaneously actuating said points in narrowing motion, means for simultaneously moving both the yarn carrier and narrowing point end-stop narrowing means to reset the same to initial position, means for disengaging said yarn carrier from said end-stop means during said resetting, means operable with said yarn carrier to control the same throughout the full operative movement thereof independently of said end-stop means, and means for causing said resetting means to operate during initial operations of knitting a fabric.

4. In a full-fashion knitting machine including narrowing mechanism, the combination of knitting mechanism, a yarn carrier, a reciprocating carrier bar, end stops for said bar, means for moving said stops to decrease the coursewise travel of said bar, means for moving said stops in the opposite direction to reset the same, means including an auxiliary stop mechanism for controlling said bar to operate through a full operative reciprocable movement thereof during the resetting of said end stops, and means for causing said resetting means to operate during initial operations of knitting a stocking blank.

5. In a straight knitting machine including narrowing mechanism, the combination of knitting mechanism, a yarn guide, a carrier bar, end stops to limit the movement of said carrier bar, means for moving said stops relative to each other to produce narrowing movement of the yarn guide, means for resetting said end stops to initial position, means for disengaging said end stops from said carrier bar during resetting, means including an auxiliary stop mechanism cooperating with said carrier bar to control operation of the knitting mechanism and restricted movement of the yarn guide during the resetting of said end stops, said restricted movement being for the full operating range of movement of said carrier bar, and means for causing said resetting means to operate during initial operations of knitting a fabric.

6. A straight knitting machine comprising a main cam shaft, a yarn carrier bar, end stops operated by connections to said shaft to limit the travel of said carrier, means for moving said end stops toward each other to shorten said carrier bar travel, means for disengaging said stops from said bar, means for resetting said stops, auxiliary means adapted to be operatively engaged to said bar during resetting of the end stops to provide for full operative movement of the bar, and means for causing said resetting means to operate during initial operations of knitting a fabric.

7. In the method of producing full fashioned knit stocking blanks on a straight knitting machine having narrowing mechanism and resetting means therefor, the step which comprises initiating the knitting of the welt portion of the stocking during the resetting of the narrowing mechanism.

8. In the method of producing full fashioned knit stocking blanks on a straight knitting machine having knitting mechanism, a plurality of yarn carriers, narrowing mechanism associated with the knitting and yarn carrier mechanisms, and resetting means therefor, the steps which include activating one of the yarn carriers and limiting its movement independently of the narrowing mechanism, producing the first course of the welt of the stocking blank to be knit, continuing to knit such welt portion, and simultaneously actuating the resetting means to bring the narrowing mechanism to its starting position.

9. In the method of producing full fashioned knit stocking blanks on a straight knitting machine having knitting mechanism, a plurality of yarn carriers, narrowing mechanism associated with the knitting and yarn carrier mechanisms, and resetting means therefor, the steps which include activating one of the yarn carriers and limiting its movement independently of the narrowing mechanism, producing the first course of the welt of the stocking blank to be knit, continuing to knit such welt portion, actuating the resetting means to bring the narrowing mechanism to its starting position, and then controlling the previously independently actuated yarn carrier by means of the narrowing mechanism.

10. A straight knitting machine comprising knitting mechanism, a yarn guide, a carrier bar, end stops to limit the movement of said bar, narrowing points, means for moving said narrowing points relative to said knitting mechanism, an auxiliary stop device associated with said carrier bar, means for disengaging said end stops from said carrier bar, means for resetting the end stops, means for operating said auxiliary stop device relative to said bar to provide for a full operative movement of the bar during the resetting of said end stops, and means for causing said resetting means to operate during initial operations of knitting a fabric.

11. In a straight knitting machine including a main cam shaft and narrowing mechanism, the combination of a plurality of yarn carriers, opposed end stop devices engageable with said carriers, means operable from said cam shaft for moving said end stop device toward each other to effect a narrowing movement of the yarn carrier, means operable from said cam shaft for moving said end stops away from each other to reset the same to initial position, an auxiliary stop mechanism operable from said main cam shaft and adapted to engage one of said yarn carriers during said resetting of the end stop devices, and means for causing said resetting means to operate during initial operations of knitting a fabric.

12. In a straight knitting machine including a main cam shaft and narrowing mechanism, the combination of knitting mechanism, a plurality of yarn carriers, opposed end stop devices engageable with said carriers, means operable from said cam shaft for moving said end stop devices toward each other to effect a narrowing in the yarn carrier movement, means operable from said cam shaft for moving said end stops away from each other to reset the same to initial position, narrowing point carriers at each side of said knitting mechanism, connections between said point carriers and said end stop actuating means for moving said end stops and said point carriers in unison, an auxiliary stop mechanism engageable with one of said yarn carriers to limit the movement thereof independently of the end stop devices, means operable from the cam shaft for actuating the auxiliary stop mechanism during the resetting of the end stop devices, and means for causing said resetting means to operate during initial operations of knitting a fabric.

13. In a straight knitting machine including a main cam shaft and a narrowing mechanism, the combination of a plurality of yarn carriers, opposed end stop devices engageable with said carriers, means for moving said end stop devices toward each other to effect a narrowing in the yarn carrier movement, means for disengaging said end stops from the yarn carriers, means for moving said stop devices away from each other to reset the same to initial position, an auxiliary stop device engageable with one of said yarn carriers to limit the movement thereof independently of said end stop devices, means operable from the cam shaft for effecting such operative engagement of the auxiliary stop device with said one carrier during the resetting of said end stop devices, and means for causing said resetting means to operate during initial operations of knitting a fabric.

14. In a straight knitting machine including a main cam shaft and a narrowing mechanism, the combination of a plurality of yarn carriers, opposed end stop devices engageable with said carriers, means for moving said end stop devices toward each other to effect a narrowing in the yarn carrier movement, means for disengaging said end stops from the yarn carrier, means for moving said stop devices away from each other to reset the same to initial position, an auxiliary stop device engageable with one of said yarn carriers to limit the movement thereof independently of said end stop devices, means for effecting such operative engagement of the auxiliary stop device during the resetting of said end stop devices, all of said means being operated from said main cam shaft, and means for causing said resetting means to operate during initial operations of knitting a fabric.

15. A full-fashion knitting machine including a knitting mechanism, a main cam shaft, a narrowing mechanism, a pattern control chain affecting movements of said cam shaft; in combination with yarn carrier bars, narrowing points, end stop devices engageable with said bars, means for disengaging said end stop devices from the bars, means for moving the stop devices toward each other in unison, means for resetting the stop devices, means for controlling one of said carrier bars during resetting of said stop devices when said end stops are disengaged therefrom to limit the movements of the bar so disengaged, all of said means being actuated by said pattern chain thru said main cam shaft, and means for causing said resetting means to operate during initial operations of knitting a stocking blank.

16. In a knitting machine, narrowing mechanism comprising a threaded spindle, a stop element actuated thereby, a pair of ratchet discs mounted on said spindle, a pawl for intermittently rotating one of said discs to turn the spindle in one direction, a second pawl engaging said other disc to turn the spindle in the opposite direction, and a third pawl engageable with said first disc adapted to operate independently of said first pawl to turn the spindle in the same direction.

17. In a knitting machine, narrowing mechanism comprising a rotatable spindle, a stop element actuable upon rotation of said spindle, a pair of ratchet discs mounted on said spindle, a reciprocating arm, a pawl engageable with one of said discs to turn the spindle in one direction, a pair of other pawls engageable with the other of said discs to rotate said spindle in the opposite direction, the pawls of said pair being operated independently of each other and both being adapted to rotate said spindle in the same direction, and means connecting all said pawls to said reciprocating arm.

18. In combination in a knitting machine, a pair of rotatable spindles, a reciprocating arm, means operatively associated with said arm and adapted to rotate said spindle in either direction, said spindles being actuable by said means both simultaneously in the one direction, also both simultaneously in the opposite direction, and one of said spindles being rotatable by said means in either direction independently of any movement of said other spindle.

19. In combination in a knitting machine, a pair of rotatable spindles, a reciprocable arm, means carried by the arm for simultaneously rotating both said spindles in one direction, other means carried by said arm for simultaneously rotating both said spindles in the opposite direction, and further means carried by said arm for rotating one of said spindles in either direction independently of said other spindle.

20. In combination in a knitting machine, a pair of rotatable spindles, a reciprocable arm, means carried by the arm for simultaneously rotating both said spindles in one direction, other means carried by said arm for simultaneously rotating both said spindles in the opposite direction, further means carried by said arm for rotating one of said spindles in either direction independently of said other spindle, and a device for selectively controlling the operation of each said means.

21. In combination in a knitting machine, a pair of rotatable spindles, a reciprocable arm, means carried by the arm for simultaneously rotating both said spindles in one direction, other means carried by said arm for simultaneously rotating both said spindles in the opposite direction, further means carried by said arm for rotating one of said spindles in either direction independently of said other spindle, and a device adapted to selectively control the operation of each said means, said control device being movable to a series of preselected stations for producing the said variation in relative rotation of said spindles.

22. In combination in a knitting machine, a pair of rotatable spindles, a reciprocable arm, means carried by the arm for simultaneously rotating both said spindles in one direction, other means carried by said arm for simultaneously rotating both said spindles in the opposite direction, further means carried by said arm for rotating one of said spindles in either direction independently of said other spindle, a multiposition control device, motion-transmission means operatively connecting said control device to each of the several means on said arm, and means for operating said control device.

23. In combination in a knitting machine, a pair of rotatable spindles, a reciprocable arm, means carried by the arm for simultaneously rotating both said spindles in one direction, other means carried by said arm for simultaneously rotating both said spindles in the opposite direction, further means carried by said arm for rotating one of said spindles in either direction independently of said other spindle, a reciprocable control device movable to several definite positions, and motion-transmission connections between said control device and each of said rotation producing means.

24. In combination in a knitting machine, a pair of rotatable spindles, a reciprocable arm, ratchet discs on said spindles, pawls carried by said arm, a reciprocable control device, a plurality of cams for moving said pawls relatively to said ratchet discs, connections between said control device and said cams whereby to selectively position said pawls to rotate said spindles either both simultaneously in one direction or both simultaneously in the opposite direction, or to rotate one of said spindles in either direction independently of said other spindle.

25. A straight knitting machine comprising knitting mechanism adapted to complete a blank during one cycle in the machine's operation, said mechanism including narrowing devices adapted to reduce the width of the blank during its production, said knitting mechanism and said narrowing devices being operated automatically and in timed relation to each other, means for automatically disengaging said narrowing devices from the knitting mechanism at the completion of the blank, automatic means for resetting said narrowing devices to initial position, and automatically operated means for controlling said knitting mechanism to initiate the knitting of a new blank during said automatic resetting of the narrowing devices.

26. A straight knitting machine comprising knitting mechanism adapted to complete a blank during one cycle in the machine's operation, said mechanism including narrowing devices adapted to reduce the width of the blank during its production, said knitting mechanism and said narrowing devices being operated automatically and in timed relation to each other, means for automatically-disengaging said narrowing devices from the knitting mechanism at the completion of the blank, automatic means for resetting said narrowing devices to initial position, automatically operated auxiliary means for controlling said knitting mechanism to operate during the resetting of said narrowing devices to start a new blank, and means operating automatically upon the completion of the resetting to reengage said narrowing devices with the knitting mechanism and simultaneously to discontinue the functioning of said auxiliary means.

27. A straight knitting machine comprising a reciprocable yarn-carrier rod, primary stops for the rod, fashioning mechanism including means for advancing and resetting said stops, auxiliary stops for the rod, and means providing for operation of the rod at the beginning of knitting a fabric during resetting of the primary stops including means for moving the primary stops out of active relation to the rod and the auxiliary stops into active relation to the rod.

28. In a straight knitting machine, yarn carriers, fashioning points, main and auxiliary stops for the carriers, means for advancing the main stops and the points from initial position in narrowing operation, mechanism for resetting the points and main stops, and means providing for the operation of a carrier during the resetting of the points and main stops comprising pattern means for controlling the auxiliary stops and governing the resetting mechanism including means for resetting the main stops to said initial position, and means for retracting the points beyond said position and advancing the points to said position.

29. A straight knitting machine comprising loop-forming means, a reciprocable yarn-carrier rod, a fashion-point rod, mechanism including primary stops for controlling the distance of movement of the carrier rod, said mechanism also including stops for controlling the distance of movement of the fashion-point rod, auxiliary stops for controlling the distance of movement of the carrier rod, means for resetting the fashion-point stops and the primary carrier-rod stops, means for causing said resetting means to operate during initial operations of knitting a fabric, and means providing for the operation of the carrier rod during the resetting of the fashion-point stops and of the primary carrier-rod stops including means for rendering the primary carrier-rod stops ineffective to control the movement of the carrier rod and operating the auxiliary stops from inactive position to active position relative to the carrier rod.

MAX RICHTER.
JULIUS BAREISS.

CERTIFICATE OF CORRECTION.

Patent No. 2,109,140. February 22, 1938.

MAX RICHTER, ET AL.

It is hereby certified that error appears in the printed specification of the above numbered patent requiring correction as follows: Page 3, second column, line 12, strike out the words "denoted at 35 and 36"; line 17, for "1938" read 1937; line 24, for "and" read end; line 52, for the syllable "spondingly" read sponding; and that the said Letters Patent should be read with these corrections therein that the same may conform to the record of the case in the Patent Office.

Signed and sealed this 5th day of April, A. D. 1938.

(Seal)

Henry Van Arsdale,
Acting Commissioner of Patents.

positions, and motion-transmission connections between said control device and each of said rotation producing means.

24. In combination in a knitting machine, a pair of rotatable spindles, a reciprocable arm, ratchet discs on said spindles, pawls carried by said arm, a reciprocable control device, a plurality of cams for moving said pawls relatively to said ratchet discs, connections between said control device and said cams whereby to selectively position said pawls to rotate said spindles either both simultaneously in one direction or both simultaneously in the opposite direction, or to rotate one of said spindles in either direction independently of said other spindle.

25. A straight knitting machine comprising knitting mechanism adapted to complete a blank during one cycle in the machine's operation, said mechanism including narrowing devices adapted to reduce the width of the blank during its production, said knitting mechanism and said narrowing devices being operated automatically and in timed relation to each other, means for automatically disengaging said narrowing devices from the knitting mechanism at the completion of the blank, automatic means for resetting said narrowing devices to initial position, and automatically operated means for controlling said knitting mechanism to initiate the knitting of a new blank during said automatic resetting of the narrowing devices.

26. A straight knitting machine comprising knitting mechanism adapted to complete a blank during one cycle in the machine's operation, said mechanism including narrowing devices adapted to reduce the width of the blank during its production, said knitting mechanism and said narrowing devices being operated automatically and in timed relation to each other, means for automatically-disengaging said narrowing devices from the knitting mechanism at the completion of the blank, automatic means for resetting said narrowing devices to initial position, automatically operated auxiliary means for controlling said knitting mechanism to operate during the resetting of said narrowing devices to start a new blank, and means operating automatically upon the completion of the resetting to reengage said narrowing devices with the knitting mechanism and simultaneously to discontinue the functioning of said auxiliary means.

27. A straight knitting machine comprising a reciprocable yarn-carrier rod, primary stops for the rod, fashioning mechanism including means for advancing and resetting said stops, auxiliary stops for the rod, and means providing for operation of the rod at the beginning of knitting a fabric during resetting of the primary stops including means for moving the primary stops out of active relation to the rod and the auxiliary stops into active relation to the rod.

28. In a straight knitting machine, yarn carriers, fashioning points, main and auxiliary stops for the carriers, means for advancing the main stops and the points from initial position in narrowing operation, mechanism for resetting the points and main stops, and means providing for the operation of a carrier during the resetting of the points and main stops comprising pattern means for controlling the auxiliary stops and governing the resetting mechanism including means for resetting the main stops to said initial position, and means for retracting the points beyond said position and advancing the points to said position.

29. A straight knitting machine comprising loop-forming means, a reciprocable yarn-carrier rod, a fashion-point rod, mechanism including primary stops for controlling the distance of movement of the carrier rod, said mechanism also including stops for controlling the distance of movement of the fashion-point rod, auxiliary stops for controlling the distance of movement of the carrier rod, means for resetting the fashion-point stops and the primary carrier-rod stops, means for causing said resetting means to operate during initial operations of knitting a fabric, and means providing for the operation of the carrier rod during the resetting of the fashion-point stops and of the primary carrier-rod stops including means for rendering the primary carrier-rod stops ineffective to control the movement of the carrier rod and operating the auxiliary stops from inactive position to active position relative to the carrier rod.

MAX RICHTER.
JULIUS BAREISS.

---

CERTIFICATE OF CORRECTION.

Patent No. 2,109,140.      February 22, 1938.

MAX RICHTER, ET AL.

It is hereby certified that error appears in the printed specification of the above numbered patent requiring correction as follows: Page 3, second column, line 12, strike out the words "denoted at 35 and 36"; line 17, for "1938" read 1937; line 24, for "and" read end; line 52, for the syllable "spondingly" read sponding; and that the said Letters Patent should be read with these corrections therein that the same may conform to the record of the case in the Patent Office.

Signed and sealed this 5th day of April, A. D. 1938.

(Seal)      Henry Van Arsdale,
Acting Commissioner of Patents.

CERTIFICATE OF CORRECTION.

Patent No. 2,109,140. February 22, 1938.

MAX RICHTER, ET AL.

It is hereby certified that error appears in the printed specification of the above numbered patent requiring correction as follows: Page 3, second column, line 12, strike out the words "denoted at 35 and 36"; line 17, for "1938" read 1937; line 24, for "and" read end; line 52, for the syllable "spondingly" read sponding; and that the said Letters Patent should be read with these corrections therein that the same may conform to the record of the case in the Patent Office.

Signed and sealed this 5th day of April, A. D. 1938.

(Seal)

Henry Van Arsdale,
Acting Commissioner of Patents.